United States Patent [19]

Kruchowy et al.

[11] Patent Number: 5,241,516
[45] Date of Patent: Aug. 31, 1993

[54] DIVER NAVIGATION SYSTEM

[75] Inventors: Roman Kruchowy, Somis; James C. Miller; Michael R. Hanks, both of Oxnard, all of Calif.

[73] Assignee: The United States of America as represented by the Secretary of the Navy, Washington, D.C.

[21] Appl. No.: 935,932

[22] Filed: Aug. 27, 1992

[51] Int. Cl.⁵ .............................................. G01S 15/00
[52] U.S. Cl. ................................... 367/118; 367/910; 367/131
[58] Field of Search ............... 367/118, 124, 127, 129, 367/907, 131, 910

[56] References Cited

U.S. PATENT DOCUMENTS

| | | | |
|---|---|---|---|
| 3,927,388 | 12/1975 | Medrano | 367/910 |
| 3,944,967 | 3/1976 | Acks et al. | 367/910 |
| 4,103,279 | 7/1978 | Dildy, Jr. et al. | 367/910 |
| 5,079,753 | 1/1992 | Suggs | 367/107 |

Primary Examiner—Daniel T. Pihulic
Attorney, Agent, or Firm—David S. Kalmbaugh; Melvin J. Sliwka

[57] ABSTRACT

A diver navigation system which provides reliable position information to enable a diver to locate and when required repair existing underwater devices such as cables, leg moorings and the like. The diver navigation system comprises a synchronous range-range navigation system operating on a repeating timing cycle, which is accurately duplicated in a master transmitter, a slave transmitter and a receiver. Within the master and slave transmitter the timing cycle is subdivided into two equal approximately one second subcycles, the first subcycle being for the master transmitter and the second subcycle being for the slave transmitter. The master transmitter sends out a tone burst signal at the beginning of the first subcycle and the slave transmitter sends out a tone burst signal at the beginning of the second subcycle. Each tone burst signal, in turn, comprises a 34 kilohertz signal followed by a 32 kilohertz signal each of which has a time period of approximately one millisecond. The tone bursts signals travel through water and arrive at the receiver delayed by a time period which is a function of range, temperature, pressure and the velocity of sound. The detection times for travel of the tone burst signals from the master transmitter and the slave transmitter are converted to range data by the receiver using the velocity of sound. The range-range data is then converted to X and Y coordinates by the receiver using a baseline length which is the distance between the master transmitter and the slave transmitter.

25 Claims, 14 Drawing Sheets

DIVER NAVIGATION SYSTEM

BACKGROUND OF THE INVENTION

1. Field of the Invention

The present invention relates generally to navigation systems and, in particular to an acoustic underwater diver navigation system which may be used by a diver to locate submerged objects.

2. Background of the Invention

Underwater diver operations for many purposes can be hampered by the lack of visibility due to the turbidity or depth of water the diver finds himself. This is especially true if the diver is attempting to locate submerged objects which are located at a considerable distance away from his current position and cannot be seen. With zero or near zero visibility, a diver also can become confused and disorientated so that he does not know north, south or other directions.

One striking example of the problems encountered by a diver under such circumstances is when he is attempting to inspect and when required repair existing sea floor equipment such as moorings, cables, cable protection systems and outfalls. In addition, the lack of visibility that an underwater diver often finds himself in may hamper attempts to install new underwater equipment, as well as inspect and repair waterfront and near shore facilities.

In the past, one widely used technique for locating an object underwater has been to provide the diver with a search line of predetermined length, for example one hundred feet, that is connected to a weight or other structure at a particular sea floor location near the object the diver is attempting to locate. The diver, who is usually weighted down, then walks in a circle while holding the line taut, after which another section of line may be added and a circle walked in the opposite direction. This circular procedure is repeated until the object is located either by a visual sighting by the diver or by snagging the taut line.

However, since a sea floor area to be surveyed may encompass an area of a circle over 2000 feet in radius from the center point of the circle, it is apparent that a diver must expend a great deal of time and energy in overlapping small circles. This is especially critical when a diver is working at approximately 300 feet or more and the bottom time is limited to thirty minutes. The diver must then be brought to the surface in a controlled manner to avoid getting decompression sickness before diving again at some time latter. Such interruption substantially increase the time required for installation of new underwater equipment or inspection and when required repairs of existing underwater equipment.

Moreover, if the sea bottom is relatively soft or is overlaid by layers of silt, a diver often finds himself knee-deep in sand or mud while walking which can be physically exhausting. Bottom holes, depressions or other geographical features which cannot be seen by the diver also pose danger if he unexpectedly encounters them.

Another current search technique is to place a sonar transmitter/receiver transducer on the sea floor so that sonic waves reflected from the diver and other underwater objects are shown as echo images on a shipboard or other remote station monitor. Based on the location of these monitored images which represent the diver and objects to be inspected or repaired, a remote station operator then gives audio commands to the underwater diver via telephone cable in an effort to guide or direct his movements to these objects. However, such remote audio guidance has not proven to be particularly efficient either in time or effort because of directional disorientation experienced by the diver due to lack of visibility.

With these and other disadvantages known to prior art underwater diver navigation systems the present invention was conceived and one of its objects is to provide a relatively simple, yet highly efficient diver navigation system to provide visual aids to a diver for quickly and safely enabling the diver to locate submerged objects for inspection and when required repair.

It is a further object of the present invention to provide a reliable diver navigation system which may be used to map and provide fixed coordinates for the installation of new underwater equipment.

It is a yet a further object of the present invention to provide a synchronous range-range diver navigation system operating on a repeating timing cycle and which indicates to the user whether he is heading in the proper direction to traverse a predetermined course to locate the underwater object to be inspected.

Various other advantages and objectives of the present invention will become apparent to those skilled in the art as a more detailed description of the present invention is set forth below.

SUMMARY OF THE INVENTION

The aforesaid and other objects of the present invention are accomplished by a diver navigation system which provides reliable position information to enable a diver to locate and when required repair existing underwater devices such as cables, leg moorings and the like. The diver navigation system comprises a synchronous range-range navigation system operating on a repeating timing cycle, which is accurately duplicated in a master transmitter, a slave transmitter and a receiver. The diver navigation system uses an approximately two second timing cycle.

Within the master and slave transmitter the timing cycle is subdivided into two equal approximately one second subcycles, the first subcycle being for the master transmitter and the second subcycle being for the slave transmitter. The master transmitter sends out a tone burst signal at the beginning of the first subcycle which is time zero for the master transmitter and the slave transmitter sends out a tone burst signal at the beginning of the second subcycle which is time zero for the slave transmitter. Each tone burst signal, in turn, comprises a 33.3 kilohertz signal followed by a 31.25 kilohertz signal each of which has a time period of approximately one millisecond.

The tone bursts signals travel through water and arrive at the receiver delayed by a time period which is a function of range, temperature, pressure and the velocity of sound. The receiver is programmed to assume that any tone burst signal detected during the first subcycle is from the master transmitter, and any tone burst signal during the second subcycle is from the slave transmitter. The maximum range is the time of one subcycle multiplied by the velocity of sound which is approximately 5,000 feet.

The detection times for travel of the tone burst signals from the master transmitter and the slave transmitter are converted to range data by the receiver using the velocity of sound. The range-range data is then converted to X and Y coordinates by the receiver using a baseline length which is the distance between the master transmitter and the slave transmitter. The origin of the X-Y coordinate system is the master transmitter, with increasing X distance being towards the slave transmitter along the baseline. Increasing Y distance is perpendicular to the baseline and increases as the diver moves away from the baseline.

DETAILED DESCRIPTION OF THE PREFERRED EMBODIMENT

Figure 1:
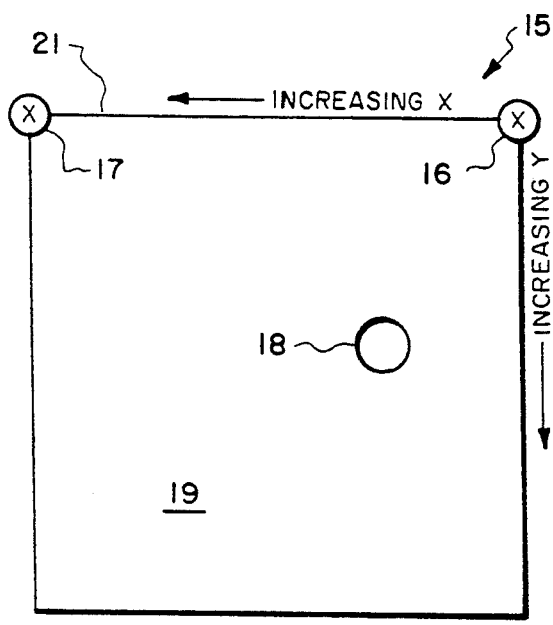
FIG. 1 illustrates an X, Y coordinate plot which defines the system operating area for the diver navigation system of the present invention.

Referring to FIG. 1, a diver navigation system 15 comprising a first or master transmitter 16, a second or slave transmitter 17 and at least one receiver 18 is shown within its system operating area 19. The system operating area 19 which is the area of coverage for diver navigation system 15 is a square of approximately 3000 feet by 3000 feet which is defined by X and Y coordinates. The X coordinate of area 19 is the distance from transmitter 16 to transmitter 17 in feet which is defined as the baseline 21, while the Y coordinate of area 19 is the distance from baseline 21 in feet in a direction perpendicular to baseline 21.

Figure 2:
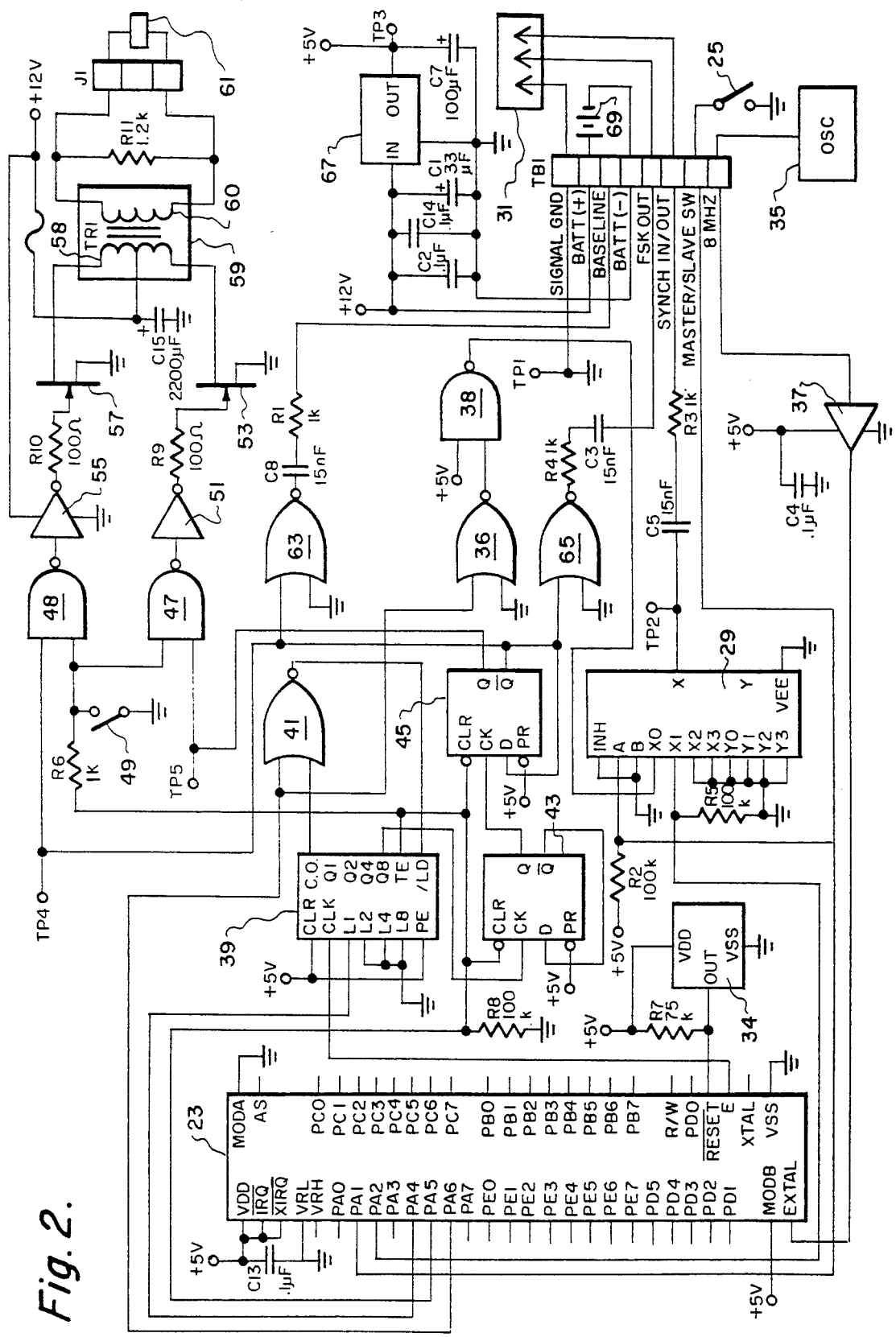
FIG. 2 is a detailed electrical schematic of the master and slave transmitters for the diver navigation system of FIG. 1.

Referring to FIGS. 1 and 2, each transmitter 16 and 17 comprises a digital signal processor 23 which has its PA1 input connected through a terminal strip TB1 and a switch 25 to ground. When switch 25 is in the closed position, thereby providing a logic zero to the PA1 input of digital signal processor 23 and the A control input of an analog multiplexer 29, the circuit of FIG. 2 functions as the master transmitter 16. In a like manner, when switch 25 is open, thereby providing +5 VDC through resistor R2 to the PA1 input of processor 23 and the A control input of multiplexer 29, the circuit of FIG. 2 functions as the slave transmitter 17.

Figure 3:
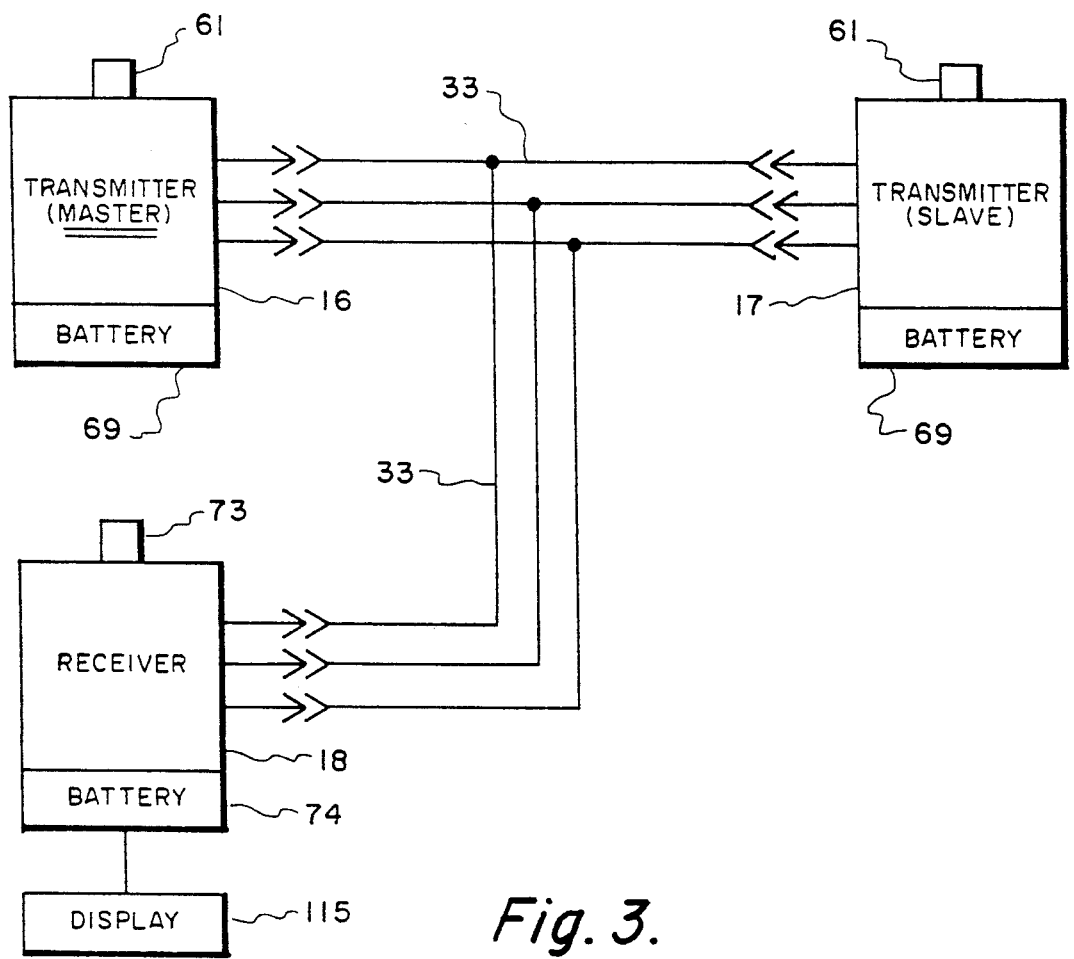
FIG. 3 illustrates the configuration of the diver navigation system during initialization of the system.

Referring to FIGS. 2 and 3, during initialization of diver navigation system 15, digital signal processor 23 reads its PA1 input and whenever the PA1 input is at the logic zero state, the circuit of FIG. 2 generates a one millisecond sync pulse 30, FIG. 4(A), which is used to synchronize transmitters 16 and 17 and receiver 18 of diver navigation system 15. Sync pulse 30 passes through multiplexer 29 and the synch in/out terminal of terminal strip TB1 to an external plug 31. As is best illustrated by FIG. 3, external plug 31 connects transmitter 16 to transmitter 17 and receiver 18 via a cable 33 so as to allow the sync pulse generated by transmitter 16 to pass through cable 33 and the sync in/out terminal of terminal strip TB1 to the X input/output of analog multiplexer 29. Since the A input of analog multiplexer is at the logic one state the synch pulse passes through multiplexer 29 to digital signal processor 23 of transmitter 17 thereby initializing processor 23 of transmitter 17.

Referring to FIG. 2, digital signal processor 23 is reset by a voltage regulator 34 which upon turning on power to diver navigation system 15 provides a logic zero to the reset input of processor 23 resetting processor 23 and then transitions to a logic one after processor 21 is reset.

The sync pulse 30 of FIG. 4(A) is generated by processor 23 approximately every two seconds after digital signal processor 23 is reset. The sync pulse is then supplied through a NOR gate 36 which inverts the sync pulse and a NAND gate 38 which again inverts the sync pulse to the synch in/out terminal of terminal strip TB1.

Digital signal processor 23 also generates a 2.000 megahertz clock signal at its E output which is a free running clock signal that has a frequency one fourth of the frequency of the 8.000 megahertz clock signal supplied to the EXTAL input of processor 23 by an oscillator 25 through an invertor 37.

The 2.000 megahertz clock signal generated by processor 23 is supplied to the clock input of a binary counter 39. The L2, L4 and L8 inputs of counter 39 are tied to ground. When digital signal processor 23 provides a logic one, FIG. 5(A), to the TE input of binary counter 39, counter 39 is enabled allowing counter 39 to either divide the 2.000 megahertz clock signal by fifteen or sixteen depending upon the value preset into counter 39 by a logic zero supplied to the /LD input of counter 39.

Digital signal processor 21 first provides a logic one to the L1 input of counter 39 so as to preset binary counter 39 such that counter 39 will divide the 2.000 megahertz clock signal generated by processor 23 by fifteen. Sync pulse 30, FIG. 4(A), which is inverted by NOR gate 41, then loads the 1,0,0,0 respectively at the L1-L8 inputs of counter 39 into counter 39. Binary counter 39 begins the count and continues to count until an overflow condition is reached, that is the Q1-Q8 outputs are at the logic one state. When counter 39 overflows, counter 39 provides at its carry output (CO) a logic one pulse which is supplied through NOR gate 41 to the /LD input of counter 39. This overflow pulse again loads the binary values at the L1-L8 inputs of counter 39 into counter 39. Counter 15 will continue to divide the 2.000 megahertz clock signal by fifteen which results in a 133.333 kilohertz signal, FIG. 5(C) occurring at the Q8 output of binary counter 39.

Figure 5:
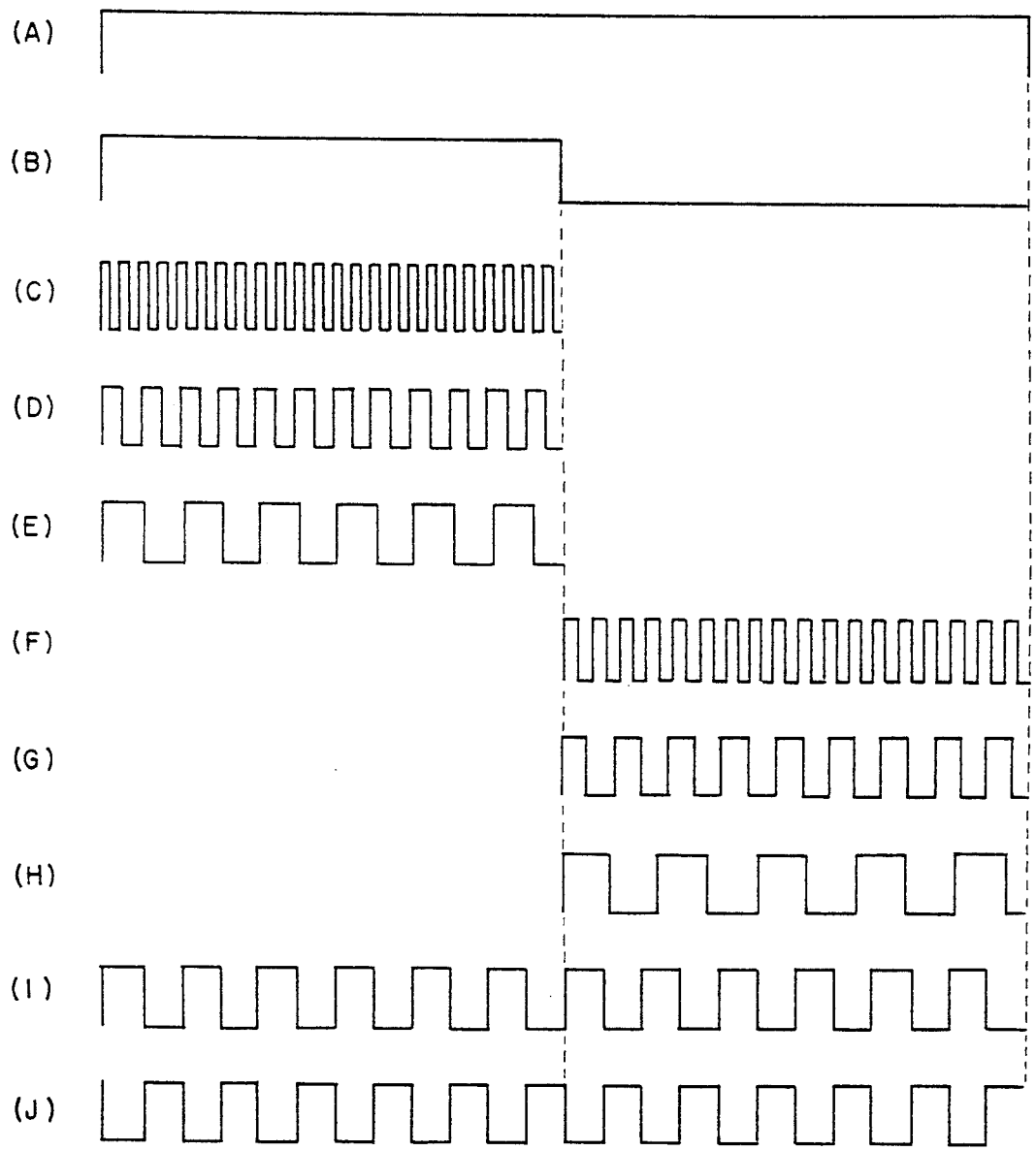
FIG. 5 is a timing diagram illustrating digital logic signals occurring at the outputs of some of the electronic components of FIG. 2.

The 133.333 kilohertz signal of FIG. 5(C) is supplied to the clock input of a D Flip-Flop 43 which divides the signal by two which results in the 66.666 kilohertz signal of FIG. 5(D) occurring at the Q output of D Flip-Flop 43. In a like manner, D Flip-Flop 45 divider the 66.666 kilohertz signal of FIG. 5(D) which results in the 33.333 kilohertz signal of FIG. 5(E) occurring at the Q output of D Flip-Flop 45, thereby providing the 33.333 kilohertz component of the signal of FIG. 5(I). It should be noted that Flip-Flops 43 and 45 also shape the signal of FIG. 5(E) so that the signal of FIG. 5(E) has a fifty percent duty cycle.

When the signal of FIG. 5(B) transitions from the logic one to the logic zero state, the first overflow pulse which occurs after the transition will load logic zeros into the L1-L8 inputs of binary counter 39. This results in binary counter 39 dividing the 2.000 megahertz clock signal by sixteen, thereby causing counter 39 to provide at its Q8 output a 125 kilohertz signal, FIG. 5(F) which is then supplied to the clock input of D Flip-Flop 43. Flip-Flop 43, in turn, divides the 128 kilohertz signal by two resulting in the 62.5 kilohertz signal of FIG. 5(G) which is then supplied to the clock input of D Flip-Flop 45. In a like manner, Flip-Flop 45 divides the 62.5 kilohertz signal by two resulting in the 31.25 kilohertz signal of FIG. 5(H) which is the 31.25 kilohertz component of the signal of FIG. 5(I). After two milliseconds, the signal of FIG. 5(A) transitions to the logic zero state disabling binary counter 39 and resetting Flip-Flops 43 and 45, such that the Q outputs of Flip-Flops 43 and 45 will remain at the logic zero state, until digital signal processor 23 generates another sync pulse 30. The signal of 5(A) is also supplied to the first inputs of NAND gates 47 and, 48, enabling NAND gates 47 and 48 when the signal of FIG. 5(A) is at the logic one state and disabling NAND gates 47 and 48 when the signal of FIG. 5(A) is at the logic zero state. It should be noted that the transmitter circuit of FIG. 2 includes a mercury switch 49 which is closed when transmitters 16 and 17 are in a horizontal position and when closed connects the first inputs of NAND gates 47 and 48 to ground thereby disabling NAND gates 47 and 48.

The signal of FIG. 5(I), which occurs at the Q output of Flip-Flop 45 is supplied to the second input of NAND gate 47 which inverts the signal and supplies the signal to an invertor 51 which again inverts and then supplies the signal of FIG. 5(I) to the gate of a field effect transistor 53. In a like manner, the signal of FIG. 5(J), which occurs at the not Q output of Flip-Flop 45, is supplied to the second input of NAND gate 48 which inverts the signal and supplies the signal to an invertor 55 which again inverts and then supplies the signal of FIG. 5(J) to the gate of a field effect transistor 57.

The drains of field effect transistors 57 and 53 are respectively connected to the first and second terminals of the primary winding of a center tap transformer 59 which functions as a push pull transformer. Since the signals of FIGS. 5(I) and 5(J) are one hundred eighty degrees out of phase, a logic one is alternatively applied to the gate of transistor 53 and transistor 57 thereby energizing in phase opposition the primary winding 58 of transformer 59. The secondary side 60 of transformer 59, which is electrically coupled to a transducer 61 drives transducer 61 by supplying to transducer 61 an approximately nine hundred volt peak to peak sinusoidal signal having the two frequency components of the signal of FIG. 5(J). In response to this sinusoidal signal provided by transformer 59, transducer 61 transmits acoustically the FSK tone burst signal of FIG. 4(B). The tone burst signal of FIG. 4(B), in turn, has a frequency component of approximately 33.33 kilohertz, followed by a frequency component of approximately 31.25 kilohertz with each component having a time period of approximately one millisecond.

Transmitter 17 operates in exactly the same manner as transmitter 16 except that the sync pulse 32, FIG. 4(C), generated by transmitter 17 is delayed by approximately one second, thereby delaying the tone burst signal, FIG. 4(D), generated by transmitter 17 by approximately one second.

At this time it should be noted that the digital signal processor 23 is a Motorola Model MC68HC11A1 8-Bit Microcontroller, binary counter 39 is a National Semiconductor Model M74HC161 Synchronous Binary Counter, analog multiplexer 29 is a National Semiconductor Model CD4052 Dual 4-Channel Analog Multiplexer/Demultiplexer, transformer 59 is a Coast Magnetics Model 30915 Transformer and transducer 61 is an International Transducer Corporation Model ITC3176 Transducer.

Figure 6:
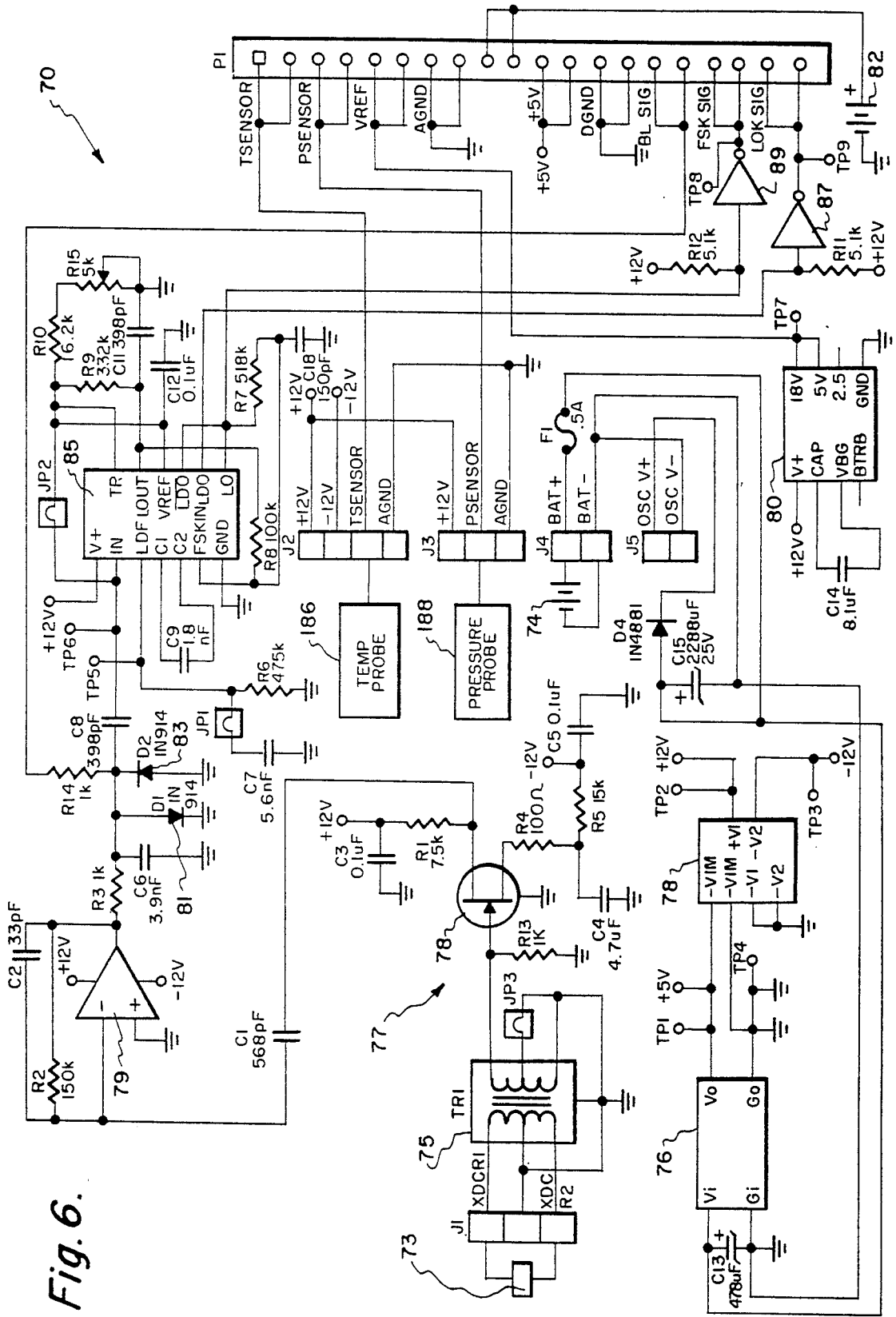
FIG. 6 is a detailed electrical schematic of the analog receiver circuit for the receiver used in the diver navigation of the present invention.
Figure 7:
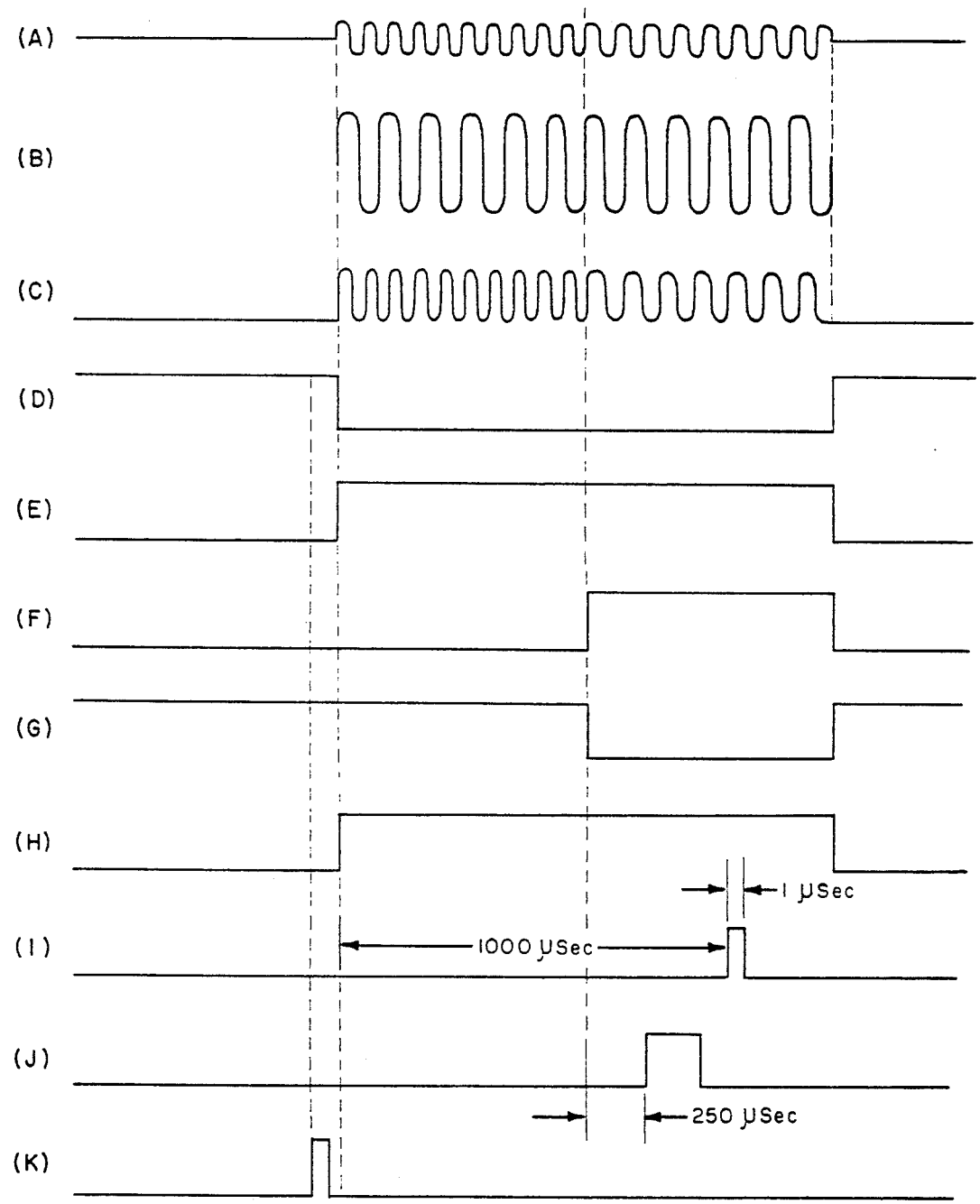
FIG. 7 is a timing diagram illustrating analog and digital logic signals occurring at the outputs of some of the electrical components of FIG. 6.

Referring to FIG. 6 there is shown the analog receiver circuit 70 which comprises a transducer/hydrophone 73 adapted to receive the tone burst signal of FIG. 4(B) from transmitter 16 and the tone burst signal of FIG. 4(D) from transmitter 17. The tone burst signal is next converted to an electrical sinusoidal signal having a one millisecond 33.33 kilohertz component followed by a one millisecond 31.25 kilohertz component as is best illustrated by FIG. 7(A). The signal of FIG. 7(A) is supplied to a transformer 75 which amplifies the signal of FIG. 7(A) by a factor of five. The sinusoidal signal is next supplied to an amplifier circuit 77 which amplifies the signal by a factor of approximately 617 in accordance with the following expression:

$$A_v = \frac{g_m \cdot R_f}{1 + g_m \cdot R_s} \tag{1}$$

where $R_f$ is the value of resistor R2, $R_s$ is the value of resistor R4 and $g_m$ is a transconductance of $7 \times 10^{-3}$ for field effect transducer 78. This, in turn, results in an overall gain of approximately 70 db for the signal of FIG. 7(A).

The amplified signal, which occurs at the output of operational amplifier 79 and which is shown in FIG. 7(B), is clipped by diodes 81 and 83 with the voltage range for the signal of FIG. 7(C) being between 0 and 0.7 VDC as is best illustrated by FIG. 7(C). The clipped signal of FIG. 7(C) is next supplied to the input of a frequency shift key demodulator 85. Demodulator 85, in turn, provides a logic one to zero transition, FIG. 7(D), at its LDO output whenever the signal of FIG. 7(C) is within the frequency range of approximately 30-35 kilohertz. Demodulator 85 also provides at its DO output a logic zero to one transition whenever there is a transition from approximately 34.1 kilohertz to 32 kilohertz as is best illustrated in FIG. 7(F).

The signal of FIG. 7(D) is next supplied to invertor 87 which inverts the signal of FIG. 7(D), thereby providing a lock detect (LOK) signal, FIG. 7(H), via terminal strip P1 to the digital receiver circuit 91. The signal of FIG. 7(F) is next supplied to invertor 89 which inverts the signal of FIG. 7(F), thereby providing a frequency shift key (FSK) signal, FIG. 7(G), via terminal strip P1 to the digital receiver circuit 91.

Figure 8A:
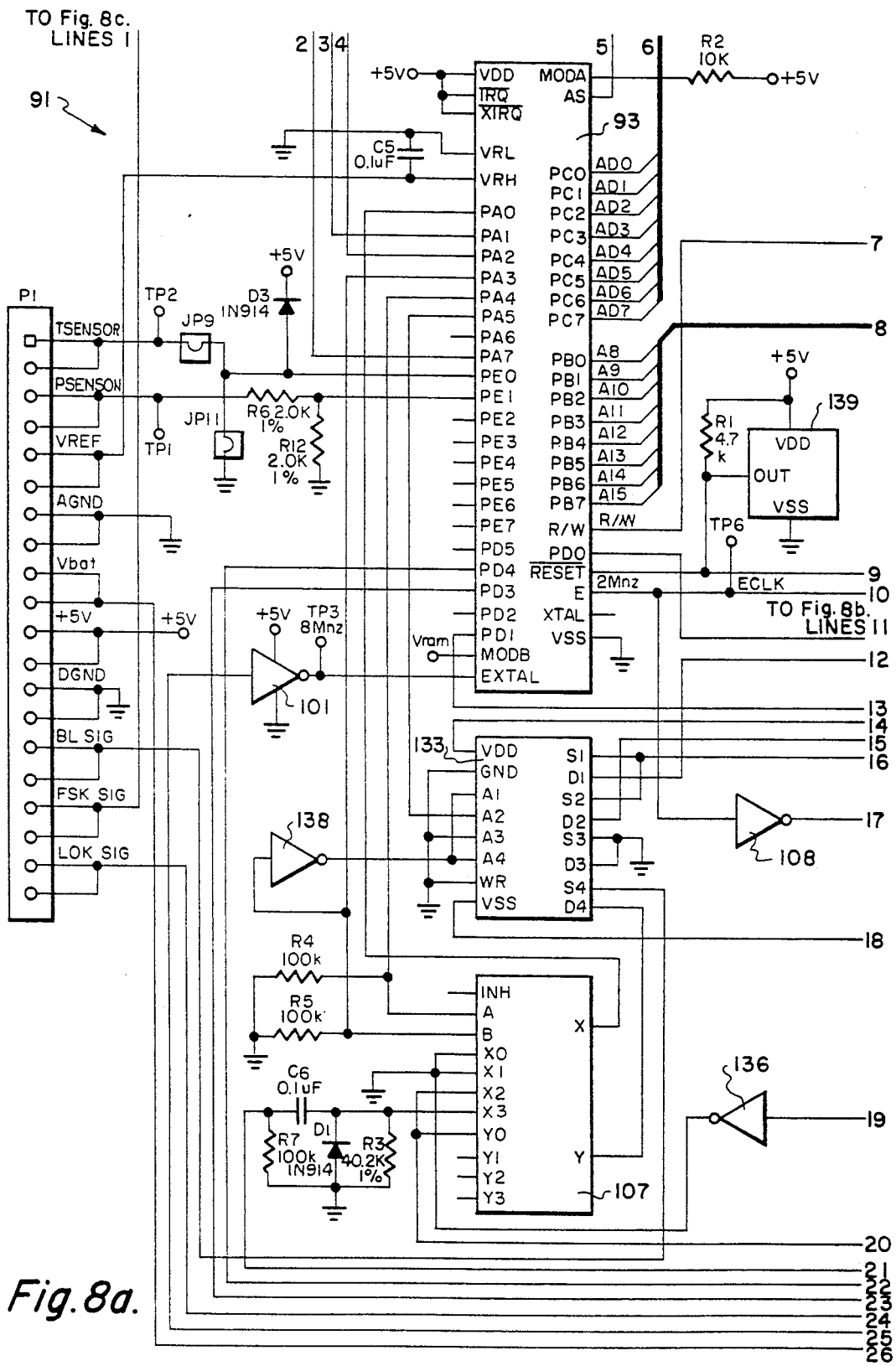
FIGS. 8a, 8b and 8c is a detailed electrical schematic of the digital receiver circuit for the receiver of the present invention.
Figure 8B:
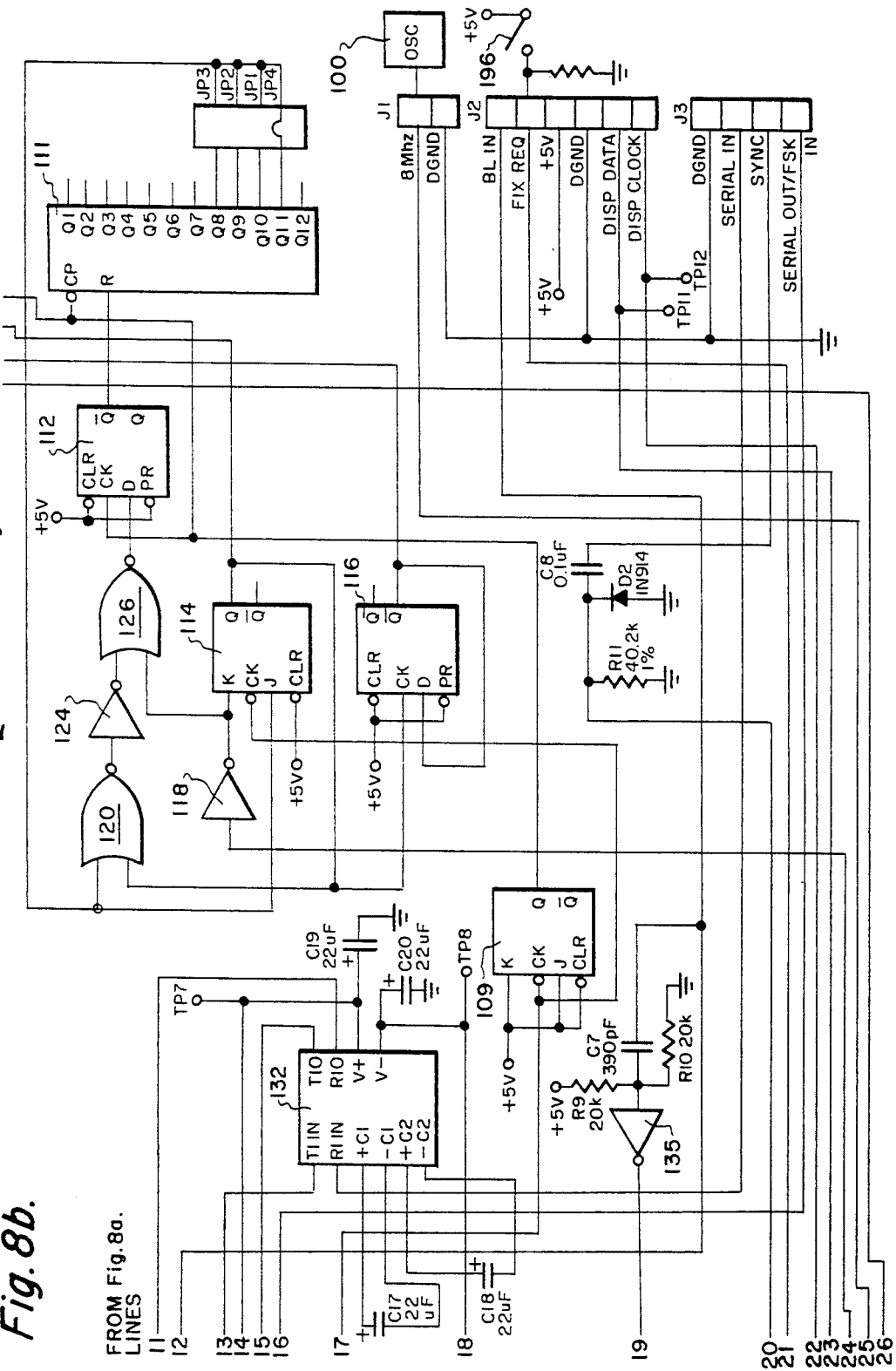
Figure 8C:
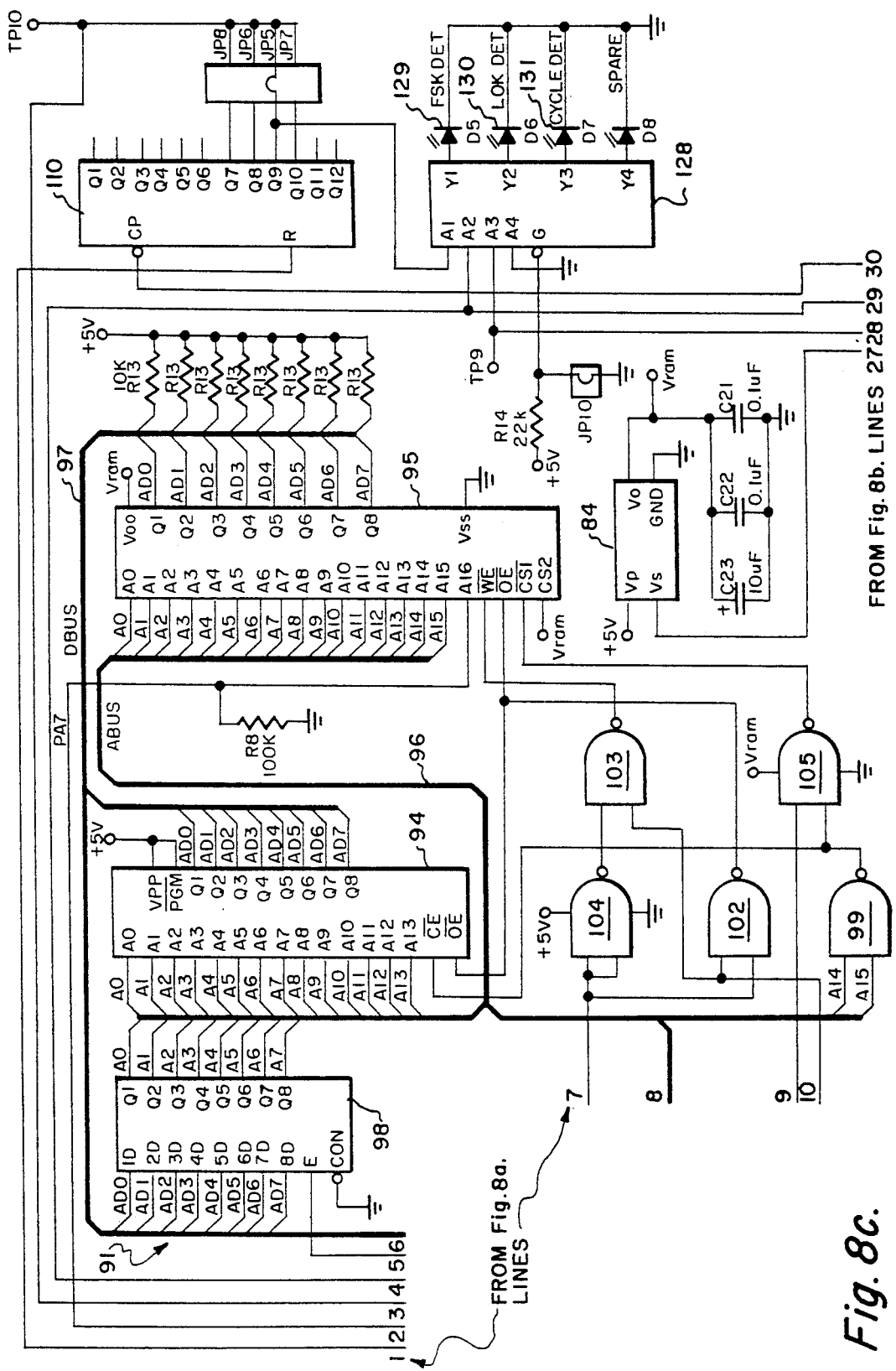

Referring to FIG. 8, digital receiver circuit 91 includes a microprocessor 93 which processes the tone burst signal of FIG. 4(B) provided by master transmitter 16 and the tone burst signal of FIG. 4(D) provided by slave transmitter 17 to determine the X—Y coordinate position of receiver 18 within area 19, FIG. 1. The program for the software used by microprocessor 93 is stored in erasable programmable red only memory (EPROM) 94. In addition, data and system operating parameters for diver navigation system 15 are stored in a random access memory (RAM) 95 within the digital receiver circuit 91 of FIGS. 8a, 8b and 8c. A sixteen bit address bus 96 and an eight bit address-data bus 97 are used to transfer addressing from microprocessor 93 to EPROM 94 and RAM 95. Eight bit address-data bus 97 is also used to transfer data from EPROM 94 to microprocessor 93 and to transfer data between microprocessor 93 and RAM 94.

The EPROM 94 used in receiver circuit 91 is an Intel 27128A 16K word×8 bit Erasable PROM. The RAM used in receiver circuit 91 is a Hitachi HM628128 128K×16 bit CMOS static RAM. Addressing for the 16k word program stored within EPROM 94 is provided from the PC0-PC7 inputs/outputs of microprocessor 93 through an octal D-type latch 98 to the A0-A7 inputs of EPROM 94. When microprocessor 93 provides an address strobe logic one signal to the enable input of latch 98, the eight bit address at the 1D-8D inputs of latch 98 are latched to the Q1-Q8 outputs of latch 98.

Logic ones provided at the P6 and P7 outputs of microprocessor 93 are supplied to the inputs of a NAND gate 99 via address bus 96. NAND gate 99 responsive to the logic ones provided to the inputs thereof supplies a logic zero to the chip enable (/CE) input of EPROM 94 enabling EPROM 94. This, in turn, will allow EPROM 94 to retrieve the program instruction at the location in memory addressed by microprocessor 93 when the output enable (/OE) input of EPROM 94 is brought to the logic zero state.

Microprocessor 93 also generates a 2.000 megahertz clock signal at its E output which is a free running clock signal that has a frequency one fourth of the frequency the 8.000 megahertz clock signal supplied to the EXTAL input of microprocessor 93 by an oscillator 100 through an invertor 101.

The two megahertz clock signal is then supplied to the first inputs of NAND gates 102 and 103. When the R/W output of microprocessor 93 transitions to the logic one state indicating that a read operation is to be processed, the next clock pulse of the two megahertz clock signal when supplied to the second input of NAND gate 102 causes the output of NAND gate 102 to transition to the logic zero state thereby providing a logic zero to the enable input of EPROM 94 which enables the Q1-Q8 outputs of EPROM 94. This, in turn, allows the eight bit word program instruction stored at the address supplied to the A0-A7 address inputs of EPROM 94 to be read from EPROM 94 and supplied to the PC0-PC7 inputs/outputs of microprocessor 93 for processing thereby.

RAM 95 is addressed by microprocessor 93 with the least significant bits of each address being first supplied to the A0-A7 inputs of latch 98 and then being provided by latch 98 to the A0-A7 inputs of RAM 95 whenever latch 98 receives an address strobe signal from microprocessor 93. The most significant bits of each address are, in turn, supplied by microprocessor 93 directly to the A8-A15 inputs of RAM 95.

Figure 9:
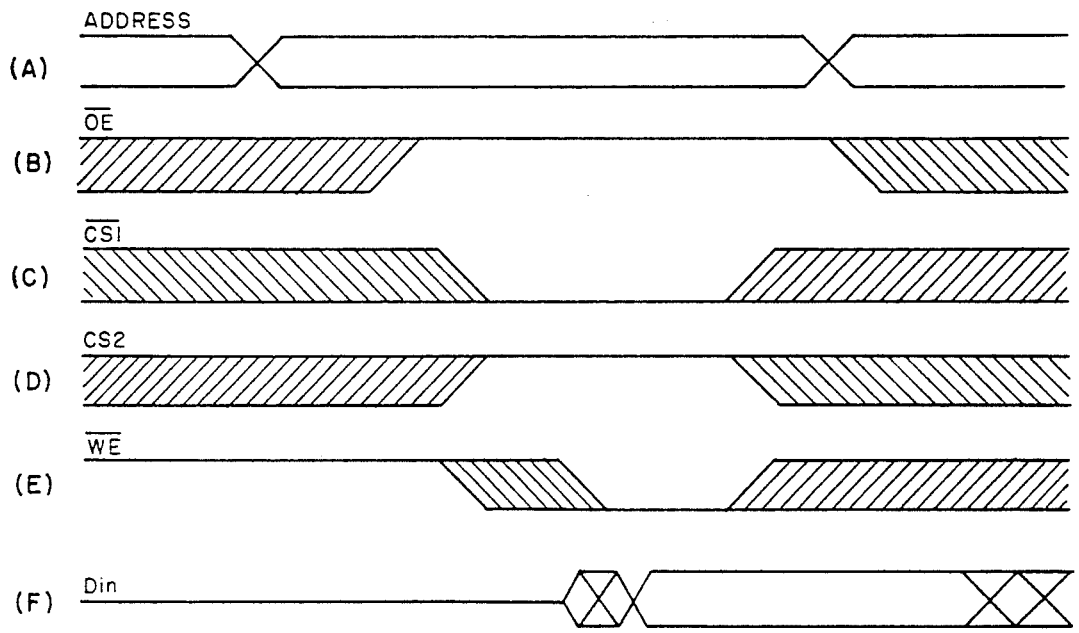
FIG. 9 is a timing diagram illustrating the write operation of the RAM in the digital receiver circuit of FIG. 8.

Whenever microprocessor 93 provides at its read/not write (R/W) output a logic zero a write operation is to be performed by RAM 95, that is data, FIG. 9(F), supplied to the Q1-Q8 inputs/outputs of RAM 95 is to be stored in RAM 95 at the address, FIG. 9(A), provided to A0-A15 inputs. The logic zero provided by microprocessor 93 is supplied to the second input of NAND gate 102 disabling NAND gate 102 such that a logic one, FIG. 9(B), is provided to the not output enable (/OE) input of RAM 95.

The logic zero provided by microprocessor 93 is also supplied to a NAND gate 104 which inverts the logic zero so as to provide a logic one to the second input of NAND gate 103 thereby enabling NAND gate 103. The next clock pulse of the two megahertz clock signal occurring after this logic zero to one transition will result in a logic zero, FIG. 9(E), being supplied to the not write enable (/WE) input of RAM 95. This, in turn, results in RAM 95 writing the eight bit data word, FIG. 9(F), at the Q1-Q8 inputs/outputs thereof into the address, FIG. 9(A), supplied to the A0-A15 inputs of RAM 95.

Figure 10:
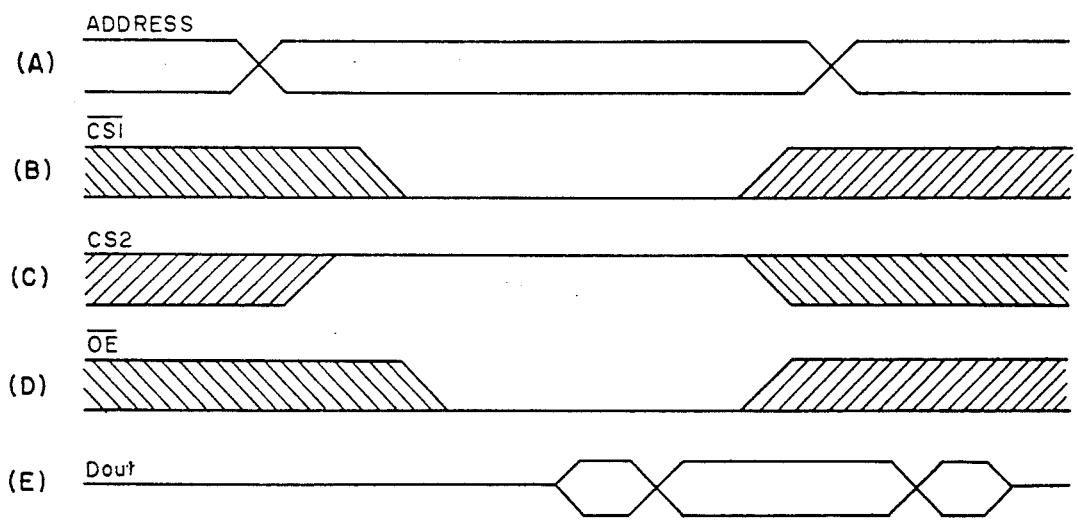
FIG. 10 is a timing diagram illustrating the read operation of the RAM in the digital receiver circuit of FIG. 8.
Figure 11A:
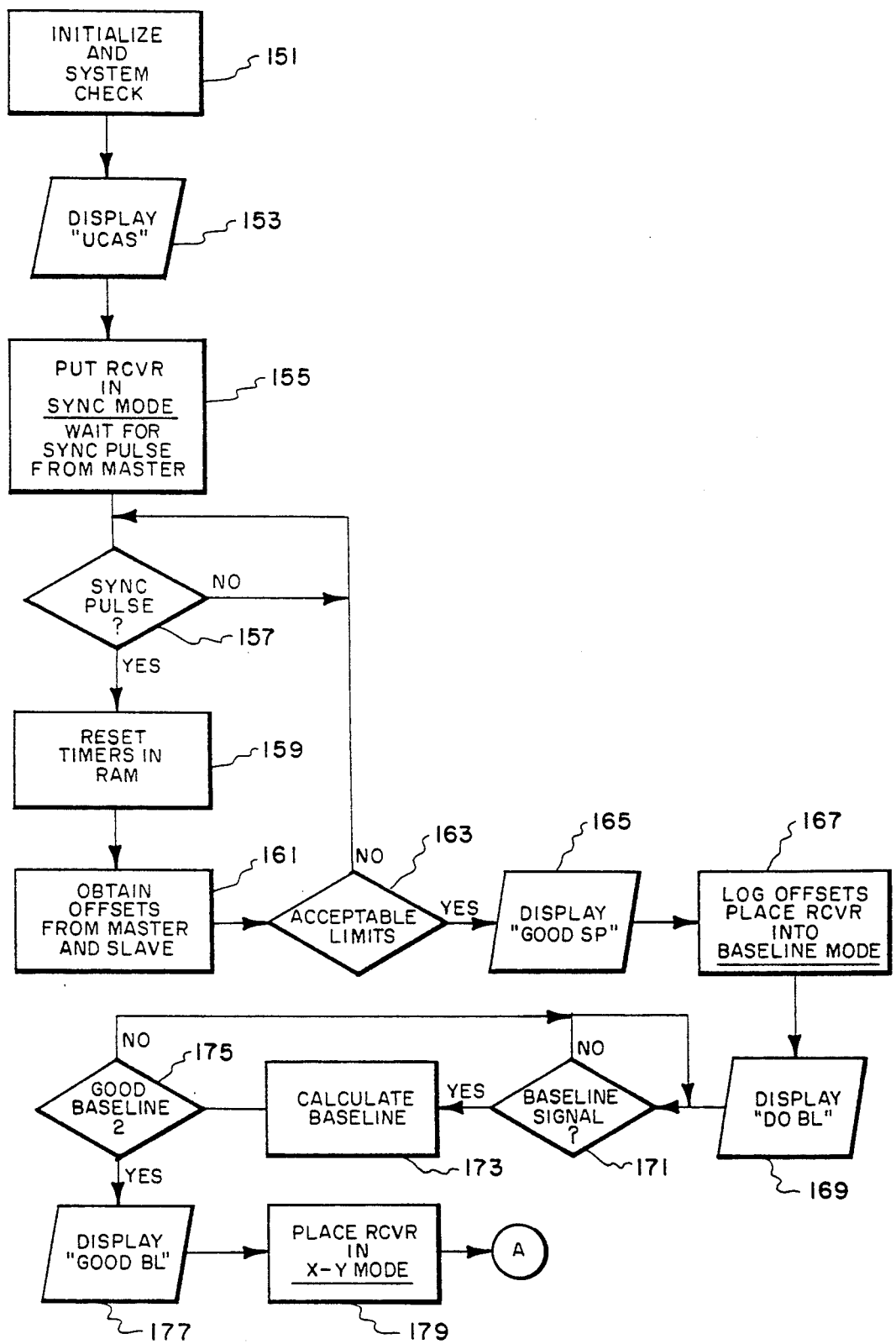
FIGS. 11a and 11b is a flow chart illustrating the operations of the receiver of the present invention.
Figure 11B:
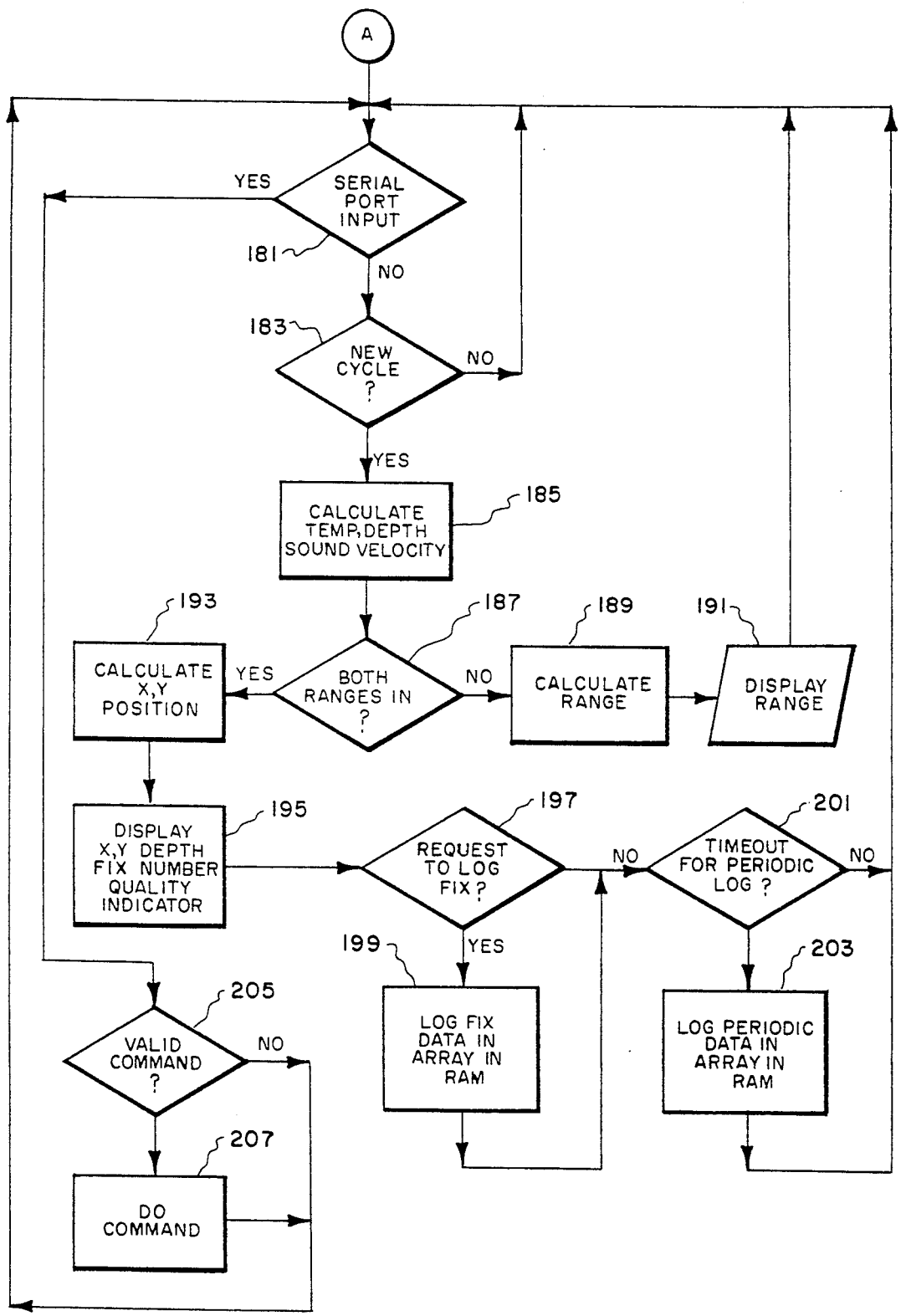

Similarly, whenever microprocessor 93 provides at its R/W output a logic one a read operation is to be performed by RAM 95, that is data stored at the address, FIG. 10(A), provided to A0-A15 inputs of RAM 95 is to be read from RAM 95 and then supplied to the Q1-Q8 inputs/outputs of RAM 95. The logic one provided by microprocessor 93 is supplied to the second input of NAND gate 102 enabling NAND gate 102 such that the next clock pulse of the two megahertz clock signal occurring after NAND gate 102 is enabled results in a logic zero, FIG. 10(D), at the /OE input of RAM 95.

This, in turn, allows RAM 95 to read the eight bit data word stored at the address, FIG. 10(A), supplied to the A0-A15 inputs of RAM 95 from memory to the Q1-Q8 inputs/outputs of RAM 95.

Referring to FIGS. 8a, 8b and 8c the two megahertz clock signal provided at the E output of microprocessor 93 is supplied through an invertor 108 to the clock input of a JK Flip-Flop 109 which divides the signal by two resulting in a one megahertz clock signal occurring at the Q output of JK Flip-Flop 109. The one megahertz clock signal is then supplied to the clock input of a binary counter 110, the clock input of a binary counter 111 and the clock input of a D Flip-Flop 112.

The FSK signal of FIG. 7(G) is supplied to the reset input of binary counter 110 enabling counter 110 which begins a binary count in response to the one megahertz clock signal supplied to the clock input of counter 110. After a binary count of 256 or approximately 250 microseconds a pulse, FIG. 7(J), occurs the Q9 output. The pulse of FIG. 7(J) is then supplied to the PA1 input of microprocessor 93 as an interrupt indicating to microprocessor 93 that a valid FSK tone burst signal has been detected by digital receiver circuit 91. However, when the signal of FIG. 7(G) fails to remain at the logic zero state for at least 250 microseconds counter 110 is reset which results in the Q9 output of counter 110 remaining at the logic zero state, thereby indicating to microprocessor 93 that digital receiver circuit 91 has not detected a valid FSK tone burst signal.

Figure 14:
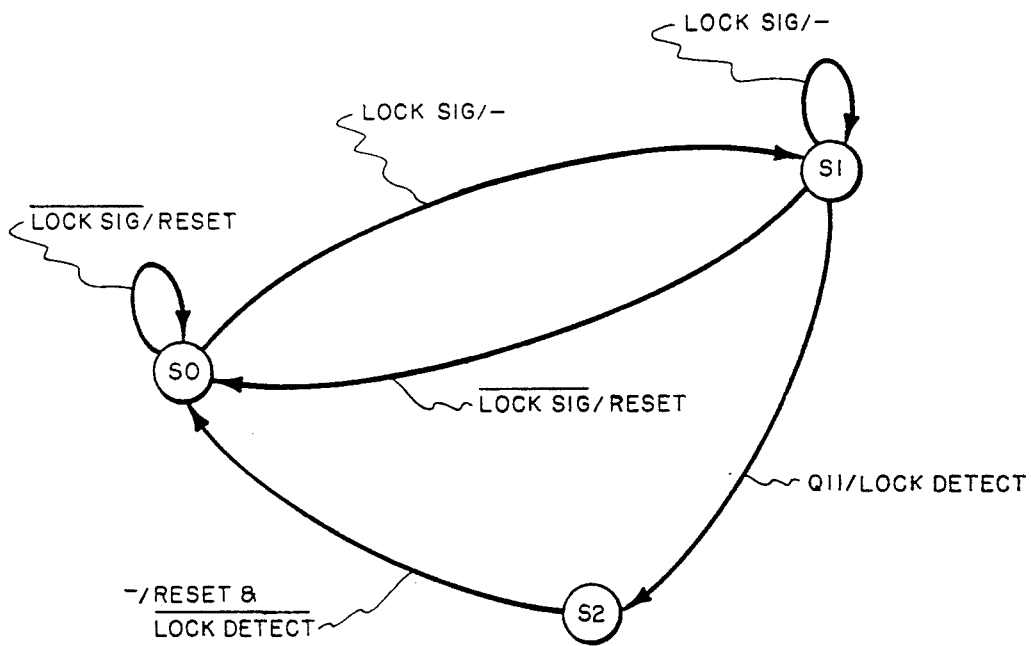
FIG. 14 is a state diagram illustrating the operation of the lock detect circuit in the receiver of the present invention.
Figure 13A:
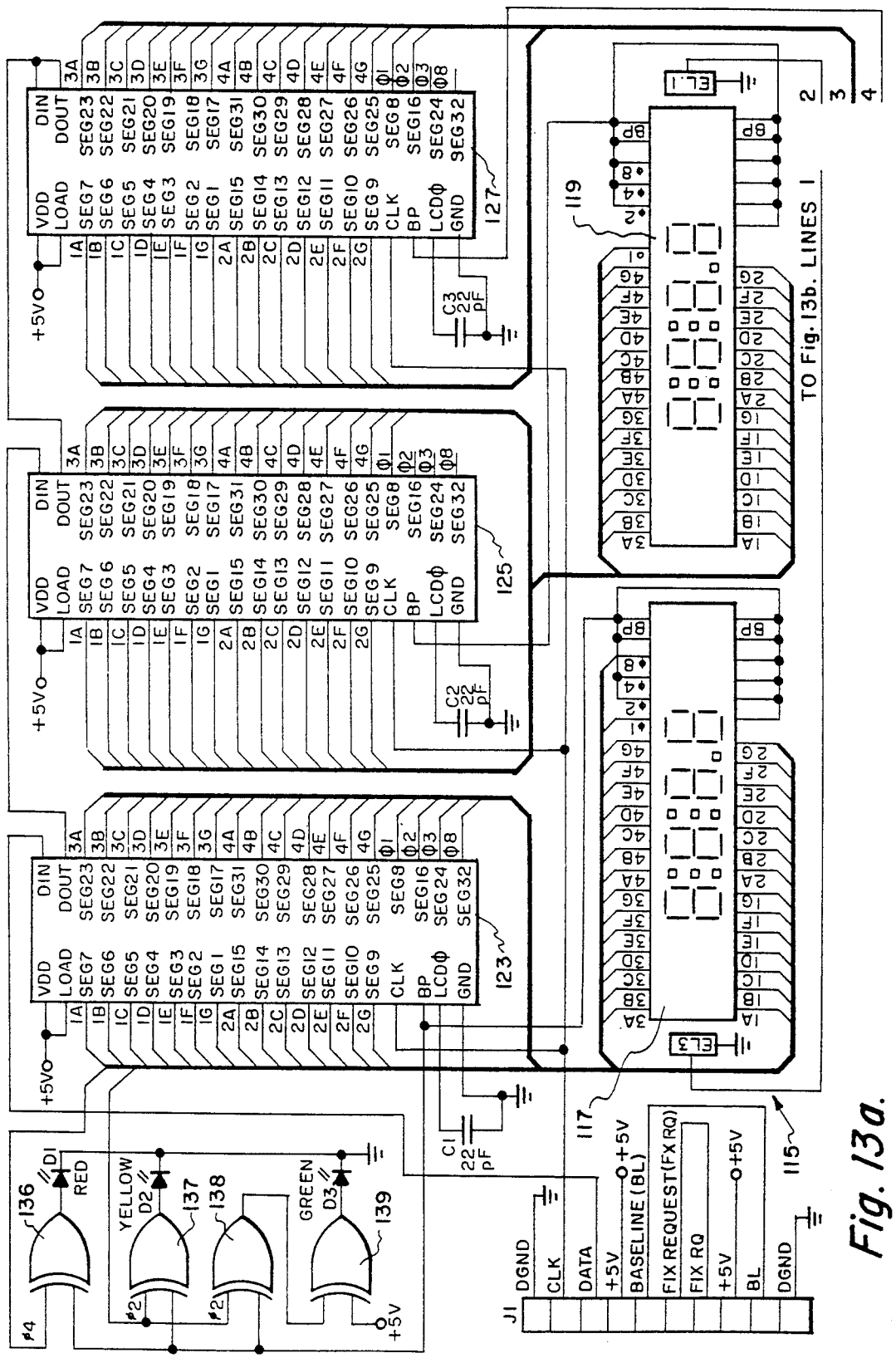

Referring to FIGS. 8a, 8b, 8c and 14 there is shown a lock detect circuit 113 which operates in accordance with the state diagram of FIG. 14. Lock detect circuit 113, in turn, provides a one microsecond pulse, FIG. 7(I) as an interrupt to the PA2 input of microprocessor 93 indicating to microprocessor 93 that a valid lock detect signal has been detected by digital receiver circuit 91. As is best illustrated by FIG. 14, during state S0 lock detect circuit, 113 will remain reset until the logic one signal of FIG. 7(H) is provided from frequency shift key demodulator 85 through invertor 118, which inverts the signal of FIG. 7(H) to the K input of Flip-Flop 114 resulting in logic zeros at the J and K inputs of Flip-Flop 114. The logic zero occurring at the output of invertor 118 is also supplied to NOR gate 126 thereby enabling NOR gate 126 such that NOR gate 126 will provide a logic one to the D input of Flip-Flop 112 which is then clocked to the Q output of Flip-Flop 112 causing the not Q output of Flip-Flop 112 to change to the logic zero state thereby enabling counter 111.

After a binary count of 1024 or approximately 1000 microseconds, counter 111 provides at its Q11 output the one microsecond pulse of FIG. 7(I) which is supplied to the first input of NOR gate 120 and the J input of Flip-Flop 114. Since the K input of Flip-Flop 114 is already at the logic zero state, the Q output of Flip-Flop 114 will transition from the logic zero state to the logic one state, remain at the logic one state for one microsecond in response to the one megahertz clock signal and then return to the logic zero state as shown by the waveform of FIG. 7(I).

As is best illustrated by the state diagram of FIG. 14, lock detect circuit 113 will reset, that is transition from state S1 to state S0, if lock detect circuit does not detect the logic one of FIG. 7(H) for a time period of at least 1000 microseconds. Whenever lock detect circuit 113 detects the logic one signal of FIG. 7(H) for the predetermined time period of approximately 1000 microseconds, lock detect circuit 113 transitions from state S1 to state S2 providing to microprocessor 93 the one microsecond pulse of FIG. 7(I) indicative of a valid lock detect. Lock detect circuit 113 next transitions from state S2 to state S0 during which lock detect circuit 113 is reset.

Digital receiver circuit 91 also includes a line driver 128 which drives light emitting diodes 129, 130 and 131. Light emitting diode 129 indicates the presence of a valid FSK signal, FIG. 7(J), light emitting diode 130 indicates the presence of a valid lock detect signal FIG. 7(I) and light emitting diode 131 which is electrically coupled to the not Q output of D Flip-Flop 116 indicates that the lock detect circuit 113 is processing the state S0-S1-S2 cycle illustrated in FIG. 14.

Referring to FIGS. 6, 8a, 8b, and 8c an external battery 74 is used to provide power to the digital and analog components of circuits 70 and 91. Battery 74 is connected to oscillator 100 supplying power to oscillator 100 and a DC/DC converter power supply 76 which converts 12 VDC to +5 VDC and then supplies the +5 VDC to the digital components of digital receiver circuit 91. The +5 VDC is also supplied to a DC/DC convertor 78 which provides +12 VDC and −12 VDC to the analog components of analog receiver circuit 70 and a voltage reference integerated circuit 80 which supplies a DC reference voltage to the analog to digital converter circuitry of microprocessor 93.

Analog receiver circuit 70 includes a battery 82 which supplies a voltage of approximately 3.8 VDC to a voltage detector 84. Voltage detector 84, in turn, monitors the +5 VDC supplied to RAM 95 by voltage regulator 76 and whenever this voltage drops below a predetermined detection voltage of approximately 4 VDC battery 82 is used to supply power to RAM 95 and thereby preserve stored data.

Referring to FIG. 8, data provided to receiver 18 from an external computer, not shown, is supplied serially through a terminal strip J3 and the serial data in line to the R1 input of a transmitter/receiver 132 which converts the data from the RS-232 industry standard protocol to TTL/CMOS compatible digital data. The digital data is then supplied to serial data input PD0 of microprocessor 93 for processing thereby. Similarly, serial data which is TTL/CMOS compatible is provided from microprocessor 93 to the T1 input of transmitter/receiver 132 for conversion to the RS-232 protocol. The RS-232 compatible data is next supplied serially to the D2 input/output of an analog switch 133 for transmission to the external computer. The D2 input/output of switch 133 is electrically connected to the S2 input/output of switch 133 when the WR input is at the logic zero state and microprocessor 93 provides a logic one to the A2 address input of switch 133 allowing the serial data to be transmitted from microprocessor 93 to the external computer.

During initialization of diver navigation system 15 the sync pulses of FIG. 4(A) are supplied from master transmitter 16 through cable 33 to terminal strip J3 of digital receiver circuit 91. When microprocessor 93 provides logic zeros to the A and B control inputs of analog multiplexer 107, multiplexer 107 electrically connects its X0 input/output to its X input/output allowing the sync pulses 30 of FIG. 4(A) to pass through multiplexer 107 to the PA0 input of microprocessor 93 so as to effect the initialization of diver navigation system 15.

In a similar manner, during initialization of diver navigation system 15 the tone burst signal of FIG. 4(B) is provided from master transmitter 16 through cable 33 and terminal strip J3 to the S1 input/output of switch 133. A logic zero provided by microprocessor 93 which is inverted to a logic one by invertor 134 electrically connects the S1 input/output of switch 133 to the D1 input/output of switch 133 allowing the signal of FIG. 4(B) to pass through switch 133 and inverters 134 and 135 to the input of a frequency shift key demodulator 85 for processing by demodulator 85.

It should be noted that during initialization of diver navigation system 15 the signals of FIGS. 4(C) and 4(D) provided by slave transmitter 17 are processed in exactly the same manner by receiver 18 as the signals of FIGS. 4(A) and 4(B). It should also be noted that the analog multiplexer 107 used in circuit 91 is a National Semiconductor Model CD4040 Dual 4-Channel Analog Multiplexer/Demultiplexer and that the analog switch 133 used in circuit 91 is an Analog Devices Model AD7590D1 Analog Switch. It should further be noted that demodulator 85 is an EXAR Model XR-2211 FSK Demodulator/Tone Decoder which is a phase-locked loop system consisting of a phase-locked loop for tracking an input signal, a quarature phase detector which provides carrier detection and an FSK voltage comparator which provides FSK demodulation.

Figure 4:
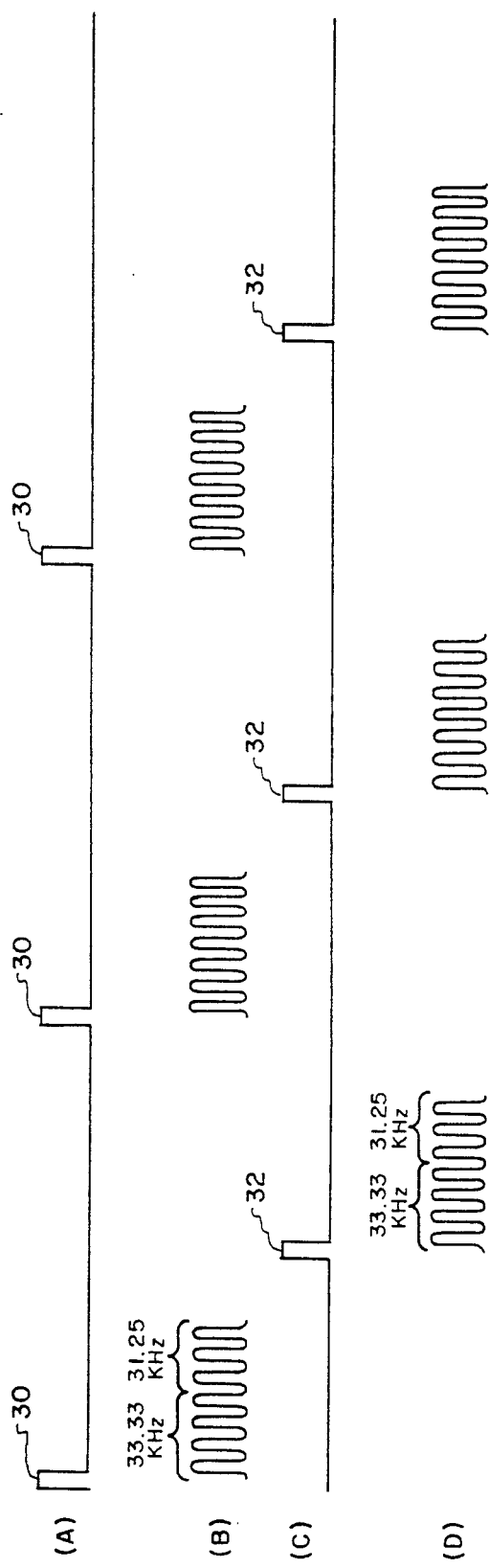
FIG. 4 is a timing diagram illustrating the sync pulse and the tone burst frequency shift key signal generated by the master and slave transmitters of the diver navigation system of FIG. 1.
Figure 13B:
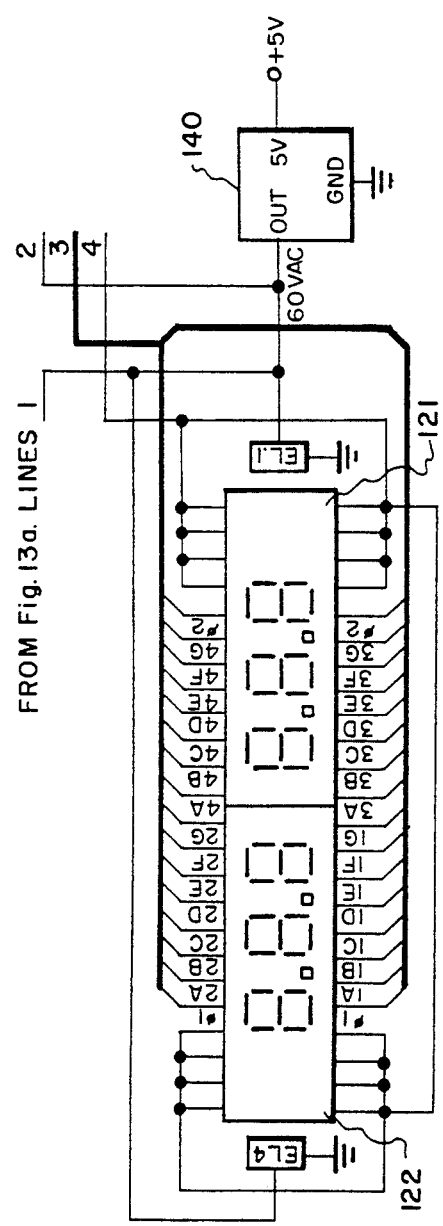
FIGS. 13a-13b is a detailed electrical schematic of the liquid crystal display of the receiver of the present invention.
Figure 12:
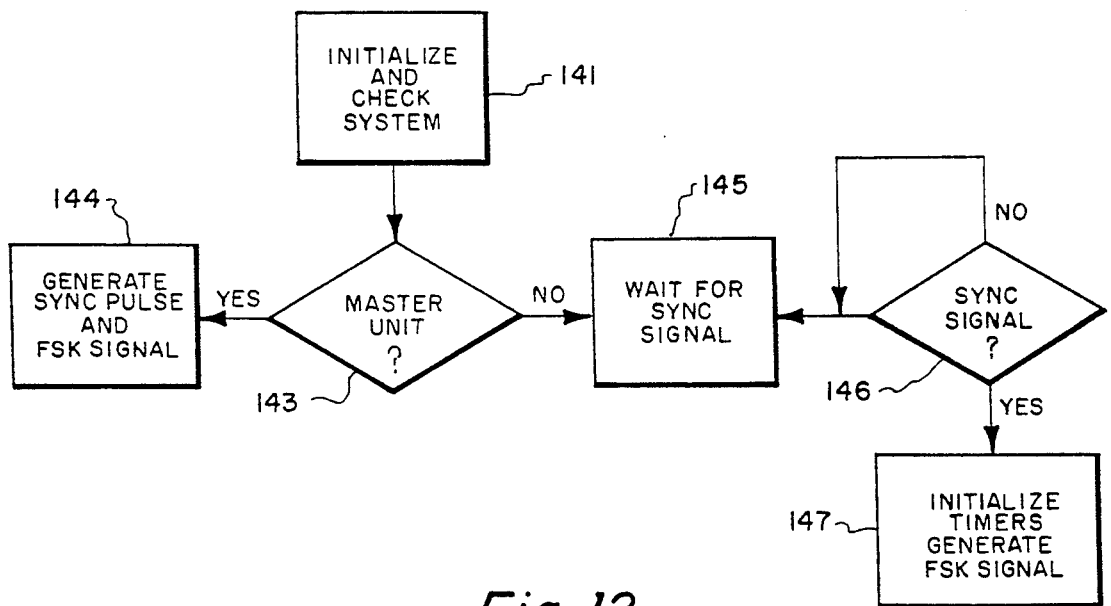
FIG. 12 is a flow chart illustrating the operations of the master and slave transmitter of the present invention.

Referring to FIGS. 2, 4 and 12, during program step 151, diver navigation system 15 is in the configuration illustrated in FIG. 3 allowing for the initialization of slave transmitter 17 and receiver 18. When switch 25 is in the closed position, thereby providing a logic zero to the PA1 input of digital signal processor 23 and the A control input of an analog multiplexer 29, the circuit of FIG. 2 is master transmitter 16 (Program steps 143). During program step 144 master transmitter 16 generates the synch pulses 30 of FIG. 4(A) and the FSK tone burst signal of FIG. 4(B) which are used to synchronize diver navigation system 15.

When switch 25 is open, the circuit of FIG. 2 is slave transmitter 17. Transmitter 17 then waits for the signal of FIG. 4(A) and upon receiving the signal of FIG. 4(A) initializes internal timers within microprocessor 23 and begins to generate the synch pulses 32 of FIG. 4(C) and the FSK tone burst signal of FIG. 4(D) which are also used to synchronize diver navigation system 15 (program steps 145-147).

Referring to FIGS. 8a, 8b, 8c, 11, 13a and 13b during program step 151 microprocessor 93 initializes internal timers and sets up arrays to collect data and performs a system check. Microprocessor 93 then provides a "UCAS" (Underwater Coordinate Acquisition System) message in digital format to a liquid crystal display 115 for display thereby (program step 153). Liquid crystal display 115, in turn, comprises four liquid crystal display elements 117, 119, 121 and 122 and three liquid crystal display drivers 123, 125 and 127. Liquid crystal display element 117 is electrically connected to liquid crystal display driver 123; liquid crystal display element 119 is electrically connected to liquid crystal display driver 125 and liquid crystal display elements 121 and 122 are electrically connected to liquid crystal display driver 127. After a warm-up of approximately five minutes which allows diver navigation system 15 to stabilize including oscillators 35 and 100, the diver navigation systems 15 is then configured as shown in FIG. 3. During program step 155 receiver 18 is in a "sync" mode, that is receiver 18 is waiting for sync pulse 30, FIG. 4(A), from the master transmitter 16 which is transmitted through cable 33 and an analog multiplexer 107 to the PA0 input of microprocessor 93.

When microprocessor 93 receives the first sync pulse 30 (program step 157) from master transmitter 16, microprocessor 93 resets internal timers within RAM 95 (program step 159) which is an integral step of the synchronization of diver navigation system 15. It should be noted that when synchronization of diver navigation system 15 is complete master transmitter 16, slave transmitter 17 and receiver 18 are at time which is defined as time equal to zero.

During program step 161, microprocessor 93 calculates offsets for the master transmitter 17 and the slave transmitter 18. When the master transmitter 17, the slave transmitter 18 and the receiver 19 are configured as shown in FIG. 3, there is, for example, a delay or offset which occurs between the synch pulses of FIG. 4(A) and 4(C) (illustrated by the waveform of FIG. 7(K) and the generation of the lock detect signal of FIG. 7(I) which may be for example 1040 microseconds. There is also a delay or offset which occurs between the synch pulses of FIGS. 4(A) and 4(C) and the generation of the FSK detect signal of FIG. 7(J) which may be for example 290 microseconds. The delay is primarily due to detector 85 filtering parameters. It should be noted that five samples are used to calculate the offsets which are averaged for the five samples.

If the offsets are determined to be within acceptable limits (program step 163) than liquid crystal display 115 displays the message "GOOD SP" (good sync pulse) indicative of completion of the synchronization process for diver navigation system 15 (program step 165). The offsets are stored in RAM 95 and diver navigation system 15 is placed in the baseline mode of operation (program step 167).

During the baseline mode of operation for diver navigation system 15 the master transmitter 16 and the slave transmitter 17 are placed a predetermined distance apart which may be up to 3000 feet as is best illustrated by FIG. 1. Liquid crystal display 115 displays the message "DO BL" (do baseline), the baseline is calculated by receiver 18 and followed by liquid crystal display 115 displaying the message "GOOD BL" which indicates that the baseline is within acceptable limits (program steps 169-177). During the baseline mode of operation a diver electrically connects the receiver 18 to either the master transmitter 16 or the slave transmitter 17 via a short cable approximately one foot, not shown. The action of plugging in the one foot cable by the diver signals the receiver microprocessor 93 that baseline calculations should commence (program step 171). The receiver 18 then calculates the acoustic transmission time from the master transmitter 16 to receiver 18 and in a like manner from the slave transmitter 17 to receiver 18. It should be noted that for the purpose of establishing the baseline signal (program step 171), the tone burst FSK signal is provided electrically from the output of NOR gate 63 through terminal strip TB1 of the transmitter 16 to terminal strip J2 of digital receiver circuit 91. It should also be noted that the baseline calculation is determined by a statistical average (approximately ten calculations) with a standard deviation not to exceed two feet for three consecutive readings.

Once the baseline is established (program step 177) receiver 18 is placed in the X—Y coordinate mode of operation (program step 179). In the X—Y mode of operation, receiver 18 is electrically disconnected from either master transmitter 16 or slave transmitter 17. During program step 181 microprocessor 93 checks for a priority interrupt from an external computer to either transmit data such as the measurement data set forth in Appendix B to the external computer or to receive data from the external computer. If, for example, the command provided is a dump command microprocessor 93 will transfer the data of Appendix A from RAM 93 to the external computer (program steps 205-207).

During program step 183 microprocessor 93 determines whether a new cycle (consisting of two one second subcycles) is to be processed, that is microprocessor 93 determines when the time interval for reception of the FSK tone burst signal of FIG. 4(B) by receiver 18 from master transmitter 16 and the FSK tone burst signal of FIG. 4(D) by receiver 18 from slave transmitter 17 (program step 183) is complete. Microprocessor 93 then process the FSK tone burst signals from master transmitter 16 and slave transmitter 17 to determine the range of receiver 18 from master transmitter 16 and slave transmitter 17.

During program step 185 microprocessor 93 calculates for each cycle the temperature of the water based upon data provided by a temperature probe 186, FIG. 6, the depth at which diver navigation system 15 is positioned based upon data provided by a pressure probe 188, FIG. 6, and the velocity of sound in seawater which is computed from temperature and depth.

During program step 187, microprocessor 93 determines whether or not receiver 18 has processed a range for both the master transmitter 16 and the slave transmitter 17. Range for master transmitter 16 is, for example, determined by the time of flight of the tone burst signal of FIG. 4(B) from transmitter 16 to receiver 18 divided by the velocity of sound in seawater. In a like manner, range for slave transmitter 17 is determined by the time of flight of the tone burst signal of FIG. 4(D) from transmitter 17 to receiver 18 divided by the velocity of sound in seawater.

When a range is provided for both master transmitter 16 and slave transmitter 17, microprocessor 93 calculates the X coordinate and the Y coordinate position for receiver 18 (program step 193). During program step 195, the X coordinate position of receiver 18 is displayed by liquid crystal display element 119, the Y coordinate position of receiver 18 is displayed by liquid crystal display element 117, the depth of receiver 18 is displayed by element 121, a fixed number is displayed by liquid crystal display element 122 and quality indicators are displayed by light emitting diodes D1, D2 and D3.

Range may be determined for master transmitter 16 when microprocessor 93, for example, receives only a lock detect pulse, FIG. 7(I), from lock detect circuit 113. This is defined by the software of for microprocessor 93 as a "type two" range detection. In a like manner, range may be determined for master transmitter 16 when microprocessor 93 receives only a FSK detect pulse, FIG. 7(J) from counter 110. This is defined by the software of for microprocessor 93 as a "type three" range detection. When microprocessor 93 receives both the lock detect pulse FIG. 7(I), and the FSK detect pulse, FIG. 7(J) a "type one" range detection is being processed by microprocessor 93. "Type four" range detection is defined by the use of range replacement data when microprocessor 93 fails to receive the lock detect pulse, FIG. 7(I) and FSK detect pulse, FIG. 7(J). "Type five" range detection is defined by the loss of the lock detect pulse, FIG. 7(I) and FSK detect pulse, FIG. 7(J) for at least five cycles. Activation of diode D1 indicates a "type one" range detection, activation of diode D2 indicates a "type two" or three range detection and activation of diode D3 indicates a "type four" range detection.

When receiver 18 fails to detect either the FSK tone burst signal of FIG. 4(B) from master transmitter 16 or the FSK tone burst signal of FIG. 4(D) from slave transmitter 17, microprocessor 93 will calculate the range for the transmitter 16 or 17 providing the detectable FSK tone burst signal (program step 189) and then display the range (program step 191). Thus, for example, if receiver 18 can detect only the FSK tone burst signal of FIG. 4(B) resulting in microprocessor 93 being able to process only the signal of FIG. 4(B) (program step 189), liquid crystal display element 119 will display the range for only master transmitter 16 (program step 191). Similarly, if receiver 18 can detect only the FSK tone burst signal of FIG. 4(D) resulting in microprocessor 93 being able to process only the signal of FIG. 4(D) (program step 189), liquid crystal display element 117 will display the range for only slave transmitter 16 (program step 191).

During program step 197 the diver can enter a fix number/position into microprocessor 93 by closing switch 196 so as to provide a logic one signal via the FIX REQ line to the PD3 input of microprocessor 93. During program step 199, the data for each fix number as illustrated in Appendix A is logged into a fixed array within RAM 95. The data for a fix file includes the fix number, X coordinate of receiver 18, Y coordinate of receiver 18, depth, temperature, cycle count which is the number of timing cycles since synchronization and a detection quality flag set forth as type in Appendix A. Thus, for example, for fix number 35 in Appendix A the X coordinate is 2020 feet, the Y coordinate is 385 feet, the depth is 21 feet, the temperature is 58 degrees, the cycle is 1172 and the type is 15. Type 15, in turn, is defined as a "type one" range detection for master transmitter 16 and a "type five" range detection for slave transmitter 17.

During program steps 201-203 a periodic file is logged into RAM 95. The periodic file includes the master transmitter 16 FSK detection time, master transmitter 16 pulse length detection time, slave transmitter 17 FSK detection time, slave transmitter 17 pulse length detection time, cycle count, temperature, pressure and baseline 21 length.

From the foregoing, it may readily be seen that the subject invention comprises a new, unique, and exceeding useful diver navigation system which constitutes a considerable improvement over the known prior art. Obviously, many modifications and variations of the present invention are possible in light of the above teachings. It is, therefore, to be understood that within the scope of the appended claims that the invention may be practiced otherwise than as specifically described.

APPENDIX A

| FIX | X | Y | TYPE | DEPTH | TEMP | CYCLE |
|-----|------|------|------|-------|------|-------|
| 18 | 2077 | 5063 | 54 | 14 | 62 | 1155 |
| 21 | 2058 | 5051 | 54 | 21 | 60 | 1158 |
| 22 | 2057 | 5049 | 54 | 22 | 59 | 1159 |
| 23 | 2057 | 5047 | 14 | 22 | 59 | 1160 |
| 24 | 2058 | 5046 | 34 | 22 | 59 | 1161 |
| 25 | 2058 | 5044 | 14 | 22 | 59 | 1162 |
| 26 | 2057 | 5044 | 14 | 22 | 59 | 1163 |
| 27 | 2057 | 5043 | 14 | 21 | 59 | 1164 |
| 28 | 2057 | 5043 | 34 | 22 | 59 | 1165 |
| 29 | 2056 | 5043 | 14 | 21 | 58 | 1166 |
| 30 | 2057 | 5043 | 24 | 21 | 58 | 1167 |
| 31 | 2057 | 5042 | 14 | 21 | 58 | 1168 |
| 32 | 2056 | 5042 | 14 | 21 | 58 | 1169 |
| 33 | 2057 | 5042 | 14 | 21 | 58 | 1170 |
| 34 | 2063 | 5042 | 24 | 21 | 58 | 1171 |
| 35 | 2020 | 385 | 15 | 21 | 58 | 1172 |
| 36 | 2056 | 5041 | 14 | 21 | 58 | 1173 |
| 37 | 2018 | 390 | 15 | 21 | 58 | 1174 |
| 38 | 2017 | 390 | 35 | 22 | 58 | 1175 |
| 39 | 2021 | 378 | 11 | 21 | 58 | 1176 |
| 40 | 2018 | 389 | 31 | 22 | 58 | 1177 |
| 41 | 2019 | 385 | 11 | 22 | 58 | 1178 |
| 42 | 2018 | 388 | 11 | 21 | 58 | 1179 |
| 43 | 2017 | 391 | 11 | 21 | 58 | 1180 |
| 44 | 2018 | 388 | 11 | 21 | 58 | 1181 |
| 45 | 2057 | 5042 | 24 | 22 | 58 | 1182 |
| 46 | 2025 | 367 | 31 | 22 | 58 | 1183 |
| 47 | 2021 | 381 | 11 | 22 | 58 | 1184 |
| 49 | 2020 | 384 | 13 | 22 | 58 | 1186 |
| 50 | 2057 | 247 | 33 | 22 | 58 | 1187 |
| 51 | 2019 | 385 | 13 | 22 | 58 | 1188 |
| 52 | 2023 | 376 | 21 | 21 | 58 | 1189 |
| 53 | 2025 | 367 | 21 | 22 | 58 | 1190 |
| 54 | 5042 | 1198 | 41 | 21 | 58 | 1191 |
| 55 | 2055 | 5042 | 14 | 21 | 58 | 1192 |
| 56 | 2065 | 5042 | 24 | 22 | 58 | 1193 |
| 57 | 2018 | 386 | 13 | 21 | 58 | 1194 |

-continued

APPENDIX A

| FIX | X | Y | TYPE | DEPTH | TEMP | CYCLE |
|---|---|---|---|---|---|---|
| 58 | 2054 | 5041 | 34 | 22 | 58 | 1195 |
| 59 | 2018 | 386 | 13 | 22 | 58 | 1196 |
| 60 | 2054 | 5041 | 14 | 22 | 58 | 1197 |
| 61 | 2055 | 5041 | 14 | 21 | 58 | 1198 |
| 62 | 2054 | 5041 | 34 | 21 | 58 | 1199 |
| 63 | 2018 | 387 | 11 | 22 | 58 | 1200 |
| 64 | 2019 | 384 | 11 | 21 | 58 | 1201 |
| 65 | 2054 | 5041 | 14 | 21 | 58 | 1202 |
| 66 | 2022 | 373 | 11 | 21 | 58 | 1203 |
| 67 | 2018 | 387 | 12 | 21 | 58 | 1204 |
| 68 | 2056 | 5041 | 14 | 22 | 58 | 1205 |
| 69 | 2054 | 5041 | 14 | 22 | 58 | 1206 |
| 70 | 2018 | 388 | 13 | 21 | 58 | 1207 |
| 71 | 2021 | 379 | 13 | 21 | 58 | 1208 |
| 72 | 2017 | 392 | 13 | 21 | 58 | 1209 |
| 73 | 2055 | 5041 | 14 | 21 | 58 | 1210 |
| 74 | 2056 | 5041 | 14 | 21 | 58 | 1211 |
| 75 | 2019 | 387 | 23 | 21 | 58 | 1212 |

What is claimed is:

1. An underwater diver navigation system for providing a visual aid to a diver in an underwater area so as to allow said diver to locate objects within said underwater area, said underwater area being visually represented to said diver as an X Y coordinate system, said underwater diver navigation system comprising:

first transmitting means for transmitting a first series of FSK tone burst signals, each of said first series of FSK tone burst signals having a first series of pulses of a first predetermined frequency followed by a second series of pulses of a second predetermined frequency;

second transmitting means for transmitting a second series of FSK tone burst signals, said second series of FSK tone burst signals being identical to said first series of FSK tone burst signals;

said first and second transmitting means alternatively transmitting said first and second FSK tone burst signals, said first and second FSK tone burst signals being spaced apart by a predetermined time period;

said first transmitting means being disposed in a fixed position, said fixed position being the origin of said X Y coordinate system;

said second transmitting means being disposed in a fixed position along the X axis of said X Y coordinate system;

receiver means for receiving said first series of FSK tone burst signals from said first transmitting means and said second series of FSK tone burst signals from said second transmitting means, said receiver means being movable within said underwater area;

said receiver means responsive to said first series of FSK tone burst signals calculating the range of said receiver means from said first transmitting means;

said receiver means responsive to said second series of FSK tone burst signals calculating the range of said receiver means from said second transmitting means;

said receiver means converting said range calculations to X Y coordinate data for visual display to said diver; and said receiver means including visual display means for providing X coordinate and Y coordinate displays to said diver.

2. The diver navigation system of claim 1 wherein said display means comprises a liquid crystal display having at least four liquid crystal display elements.

3. The diver navigation system of claim 1 wherein said receiver means includes storage means for storing therein said range data and said X Y coordinate data and a serial input and output adapted to be connected to an external computer so as to allow said range and said X Y data coordinate to be transferred to said external computer.

4. The diver navigation system of claim 1 further characterized by a temperature probe electrically connected to said receiver means, said temperature probe being adapted to provide temperature data to said receiver means.

5. The diver navigation system of claim 1 wherein said underwater area approximates a square with each of the sides of said square having a length of approximately three thousand feet, said receiver means of said diver navigation system being limited in range to said underwater area, said range limitation of said receiver means being approximately five thousand feet from either said first transmitting means or said second transmitting means.

6. The diver navigation system of claim 1 wherein the frequency of the first series of pulses of said FSK tone burst signal is thirty four kilohertz and the frequency of the second series of pulses of said FSK tone burst signal is thirty two kilohertz.

7. An underwater diver navigation system for providing a visual aid to a diver in an underwater area so as to allow said diver to locate objects within said underwater area, said underwater area being visually represented to said diver as an X Y coordinate system, said underwater diver navigation system comprising:

first transmitting means for transmitting a first series of FSK tone burst signals, each of said first series of FSK tone burst signals having a first series of pulses of a first predetermined frequency followed by a second series of pulses of a second predetermined frequency;

second transmitting means for transmitting a second series of FSK tone burst signals, said second series of FSK tone burst signals being identical to said first series of FSK tone burst signals;

said first and second transmitting means alternatively transmitting said first and second FSK tone burst signals, said first and second FSK tone burst signals being spaced apart by a predetermined time period;

said first transmitting means being disposed in a fixed position, said fixed position being the origin of said X Y coordinate system;

said second transmitting means being disposed in a fixed position along the X axis of said X Y coordinate system;

receiver means for receiving said first series of FSK tone burst signals from said first transmitting means and said second series of FSK tone burst signals from said second transmitting means, said receiver means being movable within said underwater area;

first probe means electrically connected to said receiver means, said first probe means being adapted to measure the temperature of the water surrounding said receiver means and to provide temperature data to said receiver means;

second probe means electrically connected to said receiver means, said second probe means being adapted to measure pressure, said pressure measurements being indicative of the depth said receiver means is located underwater, said second probe means being adapted to provide pressure data to said receiver means;

said receiver means responsive to said first series of FSK tone burst signals, said temperature measurements and said pressure measurements calculating the range of said receiver means from said first transmitting means;

said receiver means responsive to said second series of FSK tone burst signals, said temperature measurements and said pressure measurements calculating the range of said receiver means from said second transmitting means;

said receiver means converting said range calculations to X Y coordinate data for visual display to said diver; and said receiver means including display means for providing X coordinate and Y coordinate displays to said diver.

8. The diver navigation system of claim 7 wherein said display means comprises a liquid crystal display having at least four liquid crystal display elements.

9. The diver navigation system of claim 7 wherein said receiver means includes storage means for storing therein said range data and said X Y coordinate data and a serial input and output adapted to be connected to an external computer so as to allow said range and said X Y data coordinate to be transferred to said external computer.

10. The diver navigation system of claim 7 wherein said underwater area approximates a square with each of the sides of said square having a length of approximately three thousand feet, said receiver means of said diver navigation system being limited in range to said underwater area, said range limitation of said receiver means being approximately five thousand feet from either said first transmitting means or said second transmitting means.

11. The diver navigation system of claim 7 wherein the frequency of the first series of pulses of said FSK tone burst signal is thirty four kilohertz and the frequency of the second series of pulses of said FSK tone burst signal is thirty two kilohertz.

12. An underwater diver navigation system for providing a visual aid to a diver in an underwater area so as to allow said diver to locate objects within said underwater area, said underwater area being visually represented to said diver as an X Y coordinate system, said underwater diver navigation system comprising:

first transmitting means for transmitting a first series of acoustic FSK tone burst signals, each of said first series of FSK tone burst signals having a first series of pulses of a first predetermined frequency followed by a second series of pulses of a second predetermined frequency;

second transmitting means for transmitting a second series of acoustic FSK tone burst signals, said second series of FSK tone burst signals being identical to said first series of FSK tone burst signals;

said first and second transmitting means alternatively transmitting said first and second FSK tone burst signals, said first and second FSK tone burst signals being spaced apart by a predetermined time period;

said first transmitting means being disposed in a fixed position, said fixed position being the origin of said X Y coordinate system;

said second transmitting means being disposed in a fixed position along the X axis of said X Y coordinate system;

receiver means being moveable by said diver within said underwater area and being range limited to said underwater area and for determining the X and Y coordinates thereof within said underwater area, said receiver means including;

hydrophone means for receiving the acoustic FSK tone burst signals from said first transmitting means and said second transmitting means, said hydrophone means being adapted to convert said acoustic FSK tone burst signals to electrical equivalents thereof;

means electrically connected to said hydrophone means for amplifying each of said FSK tone burst signals from said first and second transmitting means;

FSK signal processing means electrically connected to said amplifying means for providing an FSK detect logic signal whenever said FSK signal processing means detects the transition of said FSK tone burst signal from said first predetermined frequency to said second predetermined frequency;

said FSK signal processing means providing a lock detect logic signal whenever said FSK processing means detects a logic signal provided thereto is within a predetermined frequency range, said predetermined frequency range including the frequencies of said FSK tone burst signals;

counter means electrically connected to said FSK signal processing means for providing an FSK detect pulse whenever said FSK tone burst signal remains at a predetermined logic level for a first predetermined binary count;

state machine means electrically connected to said FSK signal processing means for providing a lock detect pulse whenever said lock detect signal remains at a predetermined logic level for a second predetermined binary count; and microprocessor means responsive to said FSK detect pulses and said lock detect pulses resulting from said first series of FSK tone burst signals calculating the range of said first transmitting means from said receiver means;

said microprocessor means responsive to said FSK detect pulses and said lock detect pulses resulting from said second series of FSK tone burst signals calculating the range of said second transmitting means from said receiver means;

said microprocessor means converting said range calculations to X Y coordinate data for visual display to said diver; and display means for providing X coordinate and Y coordinate visual displays to said diver.

13. The diver navigation system of claim 12 wherein said display means comprises a liquid crystal display having at least four liquid crystal display elements.

14. The diver navigation system of claim 12 wherein said receiver means includes storage means for storing therein said range data and said X Y coordinate data and a serial input and output adapted to be connected to an external computer so as to allow said range and said X Y data coordinate to be transferred to said external computer.

15. The diver navigation system of claim 12 further characterized by a temperature probe electrically connected to said receiver means, said temperature probe being adapted to provide temperature data to said receiver means.

16. The diver navigation system of claim 12 wherein said underwater area approximates a square with each of the sides of said square having a length of approximately three thousand feet, said receiver means of said diver navigation system being limited in range to said underwater area, said range limitation of said receiver means being approximately five thousand feet from either said first transmitting means or said second transmitting means.

17. The diver navigation system of claim 12 wherein the frequency of the first series of pulses of said FSK tone burst signal is thirty four kilohertz and the frequency of the second series of pulses of said FSK tone burst signal is thirty two kilohertz.

18. The diver navigation system of claim 12 wherein said FSK signal processing means comprises an FSK demodulator.

19. An underwater diver navigation system for providing a visual aid to a diver in an underwater area so as to allow said diver to locate objects within said underwater area, said underwater area being visually represented to said diver as an X Y coordinate system, said underwater diver navigation system comprising:

first transmitting means for transmitting a first series of acoustic FSK tone burst signals, each of said first series of FSK tone burst signals having a first series of pulses of a first predetermined frequency followed by a second series of pulses of a second predetermined frequency;

second transmitting means for transmitting a second series of acoustic FSK tone burst signals, said second series of FSK tone burst signals being identical to said first series of FSK tone burst signals;

said first and second transmitting means alternatively transmitting said first and second FSK tone burst signals, said first and second FSK tone burst signals being spaced apart by a predetermined time period;

said first transmitting means being disposed in a fixed position, said fixed position being the origin of said X Y coordinate system;

said second transmitting means being disposed in a fixed position along the X axis of said X Y coordinate system;

receiver means being moveable by said diver within said underwater area and being range limited to said underwater area and for determining the X and Y coordinates thereof within said underwater area, said receiver means including;

hydrophone means for receiving the acoustic FSK tone burst signals from said first transmitting means and said second transmitting means, said hydrophone means being adapted to convert said acoustic FSK tone burst signals to electrical equivalents thereof;

means electrically connected to said hydrophone means for amplifying each of said FSK tone burst signals from said first and second transmitting means;

FSK signal processing means electrically connected to said amplifying means for providing an FSK detect logic signal whenever said FSK signal processing means detects the transition of said FSK tone burst signal from said first predetermined frequency to said second predetermined frequency;

said FSK signal processing means providing a lock detect logic signal whenever said FSK processing means detects a logic signal provided thereto is within a predetermined frequency range, said predetermined frequency range including the frequencies of said FSK tone burst signals;

counter means electrically connected to said FSK signal processing means for providing an FSK detect pulse whenever said FSK tone burst signal remains at a predetermined logic level for a first predetermined binary count;

state machine means electrically connected to said FSK signal processing means for providing a lock detect pulse whenever said lock detect signal remains at a predetermined logic level for a second predetermined binary count;

first probe means electrically connected to said receiver means, said first probe means being adapted to measure the temperature of the water surrounding said receiver means and to provide temperature data to said receiver means;

second probe means electrically connected to said receiver means, said second probe means being adapted to measure pressure, said pressure measurements being indicative of the depth said receiver means is located underwater, said second probe means being adapted to provide pressure data to said receiver means; and microprocessor means responsive to said FSK detect pulses and said lock detect pulses resulting from said first series of FSK tone burst signals, said temperature data and said pressure data calculating the range of said first transmitting means from said receiver means;

said microprocessor means responsive to said FSK detect pulses and said lock detect pulses resulting from said second series of FSK tone burst signals, said temperature data and said pressure data calculating the range of said second transmitting means from said receiver means;

said microprocessor means converting said range calculations to X Y coordinate data for visual display to said diver;

said microprocessor means generating a system clock signal; and display means for providing X coordinate and Y coordinate visual displays to said diver.

20. The diver navigation system of claim 19 wherein said display means comprises a liquid crystal display having at least four liquid crystal display elements.

21. The diver navigation system of claim 19 wherein said receiver means includes storage means for storing therein said range data and said X Y coordinate data and a serial input and output adapted to be connected to an external computer so as to allow said range and said X Y data coordinate to be transferred to said external computer.

22. The diver navigation system of claim 19 wherein said underwater area approximates a square with each of the sides of said square having a length of approximately three thousand feet, said receiver means of said diver navigation system being limited in range to said underwater area, said range limitation of said receiver means being approximately five thousand feet from either said first transmitting means or said second transmitting means.

23. The diver navigation system of claim 19 wherein the frequency of the first series of pulses of said FSK tone burst signal is thirty four kilohertz and the frequency of the second series of pulses of said FSK tone burst signal is thirty two kilohertz.

24. The diver navigation system of claim 19 wherein said FSK signal processing means comprises an FSK demodulator.

25. The diver navigation system of claim 12 wherein said state machine means comprises:
- a first invertor having an input adapted to receive said system clock signal and an output;
- a direct current voltage source having an output;
- a first JK Flip-Flop having a clock input connected to the output of said first invertor, J and K inputs connected to the output of said direct current voltage source and a Q output;
- a D Flip-Flop having a clock input connected to the Q output of said first JK Flip-Flop, a data input and a not Q output;
- a binary counter having a clock input connected to the Q output of said first JK Flip-Flop, a reset input connected to the not Q output of said D Flip-Flop and a binary count output;
- a first NOR gate having a first input connected to the binary count output of said binary counter, a second input and an output;
- a second invertor having an input connected to the output of said first NOR gate and an output;
- a second NOR gate having a first input connected to the output of said first NOR gate, an output connected to the data input of said D Flip-Flop and a second input;
- a third invertor having an input adapted to receive said lock detect signal and an output connected to the second input of said second NOR gate; and
- a second JK Flip-Flop having a clock input connected to the output of said first NOR gate, a J input connected to the binary count output of said binary counter, a K input connected to the output of said third invertor and a Q output connected to the second input of said first NOR gate;
- the Q output of said second JK Flip-Flop being electrically connected to said microprocessor means so as to provide said lock detect pulses to said microprocessor means.

* * * * *